United States Patent [19]
Yoneda et al.

[11] Patent Number: 5,519,811
[45] Date of Patent: May 21, 1996

[54] NEURAL NETWORK, PROCESSOR, AND PATTERN RECOGNITION APPARATUS

[75] Inventors: Hideki Yoneda, Tokyo, Japan; Edgar Sánchez-Sinencio, College Station, Tex.

[73] Assignee: Kawasaki Steel Corporation, Japan

[21] Appl. No.: 971,823

[22] PCT Filed: Oct. 17, 1991

[86] PCT No.: PCT/JP91/01421

§ 371 Date: Feb. 17, 1993

§ 102(e) Date: Feb. 17, 1993

[87] PCT Pub. No.: WO93/08528

PCT Pub. Date: Apr. 29, 1993

[51] Int. Cl.$^6$ ................................................. G06F 15/18
[52] U.S. Cl. ........................ 395/24; 395/27; 364/DIG. 2
[58] Field of Search ................................ 395/24, 23, 22, 395/27; 364/DIG. 2

[56] References Cited

U.S. PATENT DOCUMENTS

| | | | |
|---|---|---|---|
| 5,083,285 | 1/1992 | Shima et al. | 395/24 |
| 5,091,864 | 2/1992 | Baji et al. | 395/27 |
| 5,138,695 | 8/1992 | Means et al. | 395/27 |

FOREIGN PATENT DOCUMENTS

| | | |
|---|---|---|
| 3-73080 | 3/1991 | Japan . |
| 3-80379 | 4/1991 | Japan . |

OTHER PUBLICATIONS

Programmable Analog Vector–Matrix Multipliers Francis Kub et al. IEEE Feb. 1990.
VLSI Design of Compact and High–Precision Analog Neurat Network Processors Choi et al. IEEE 7–11 Jun. 1992.
A Massively Parallel and Highly Pipelined VLSI Analog Neocognitron Image Processor Yoneda et al. IEEE 10–13 May 1992.
An Analog Cell Library Useful for Ann Zhong et al., IEEE 1–4 Apr. 1990.
A Massively Parallel and Highly Pipelined VLSI Analog Neo Cognitron Image Processor. Yoneda, Thesis Aug. 1991.
"A CCD Programmable Image Processor and Its Neural Network Applications," Chiang, Alice M. and Chuang, Michael L. *J. Solid–State Circuits*, vol. 26, No. 12, pp. 1894–1901, Dec. 1991

*Primary Examiner*—Allen R. MacDonald
*Assistant Examiner*—Richemond Dorvil
*Attorney, Agent, or Firm*—Oliff & Berridge

[57] ABSTRACT

Apparatus for realizing a neural network of a complex structure, such as the Neocognitron, in a neural network processor comprises processing elements corresponding to the neurons of a multilayer feed-forward neural network. Each of the processing elements comprises an MOS analog circuit that receives input voltage signals and provides output voltage signals. The MOS analog circuits are arranged in a systolic array.

27 Claims, 19 Drawing Sheets

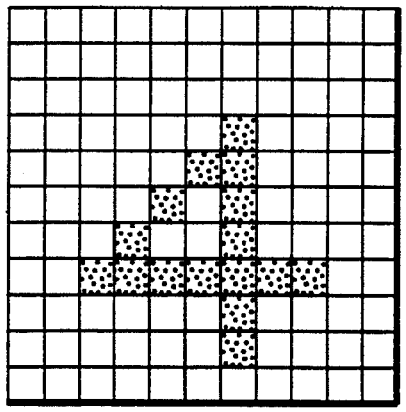
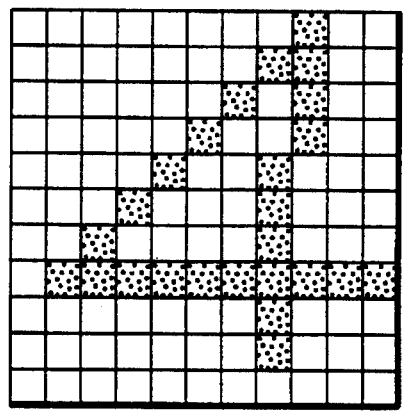
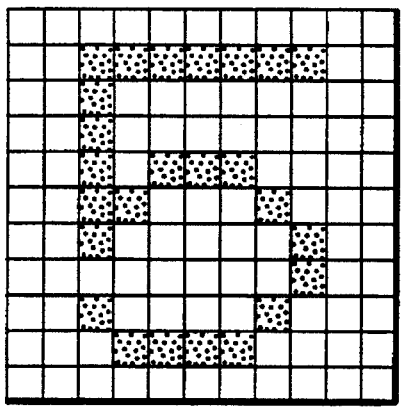
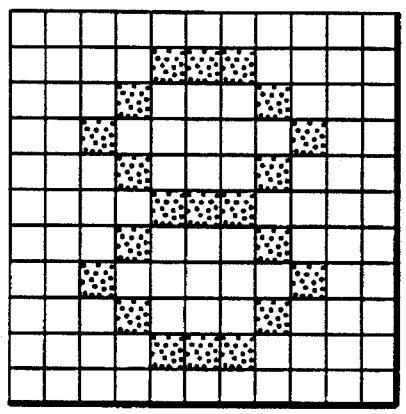
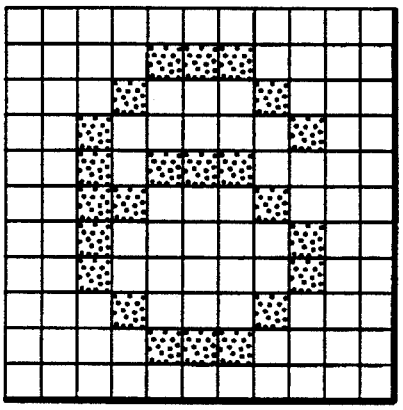
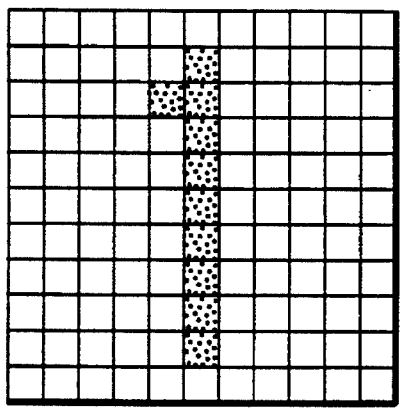
FIG. 1

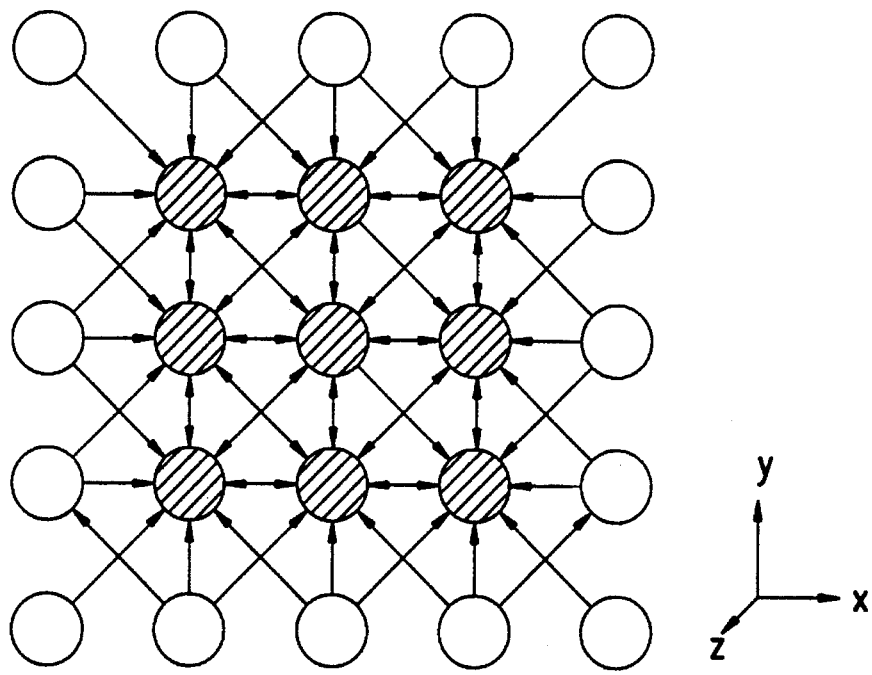
FIG.5(A)
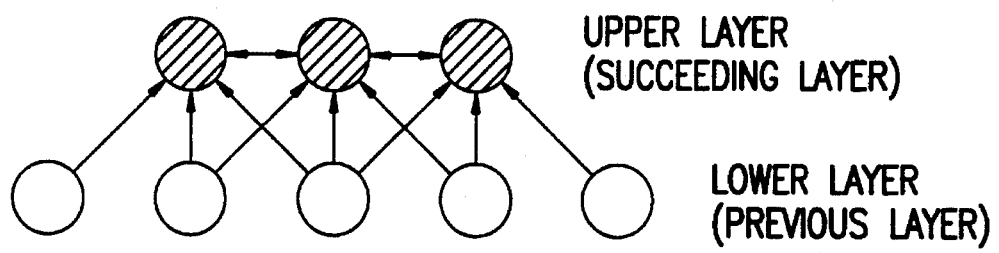
UPPER LAYER
(SUCCEEDING LAYER)
LOWER LAYER
(PREVIOUS LAYER)
FIG.5(B)
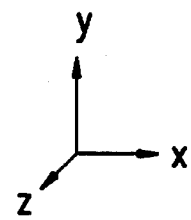

TWELVE SETS OF COEFFICIENTS FOR $U_{S1}$ LAYER

SETS OF COEFFICIENTS FOR $U_{S2}$ LAYER

SOLID = V (INPUT)
BLANK = 0 (CONSTANT)

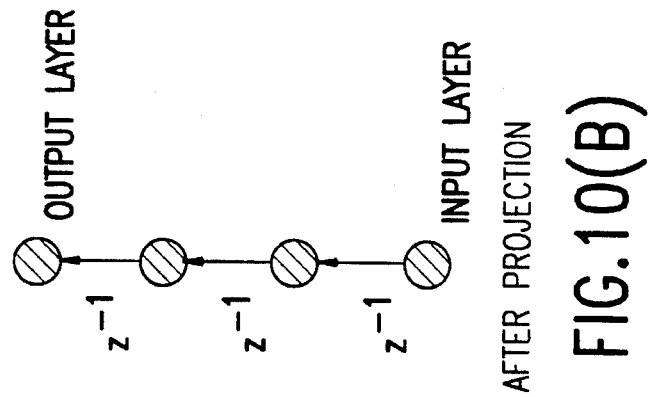
FIG.10(B) AFTER PROJECTION
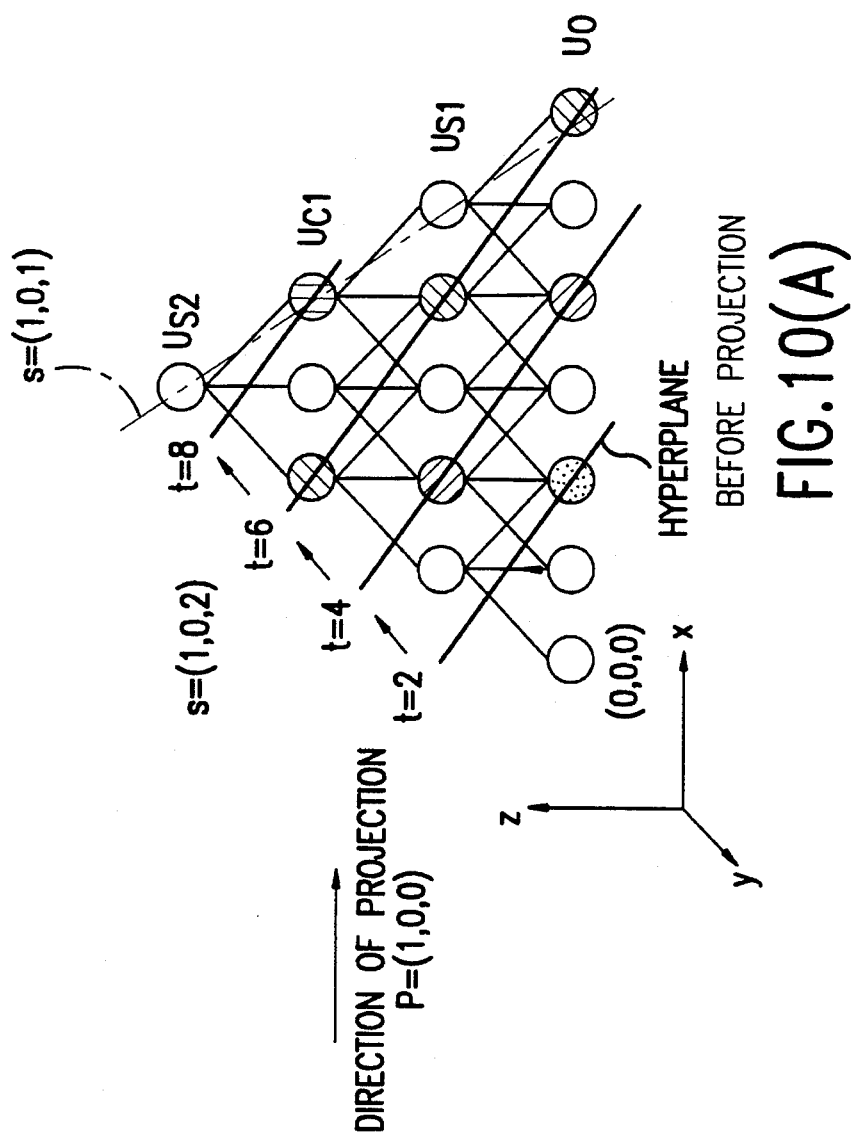
FIG.10(A) BEFORE PROJECTION

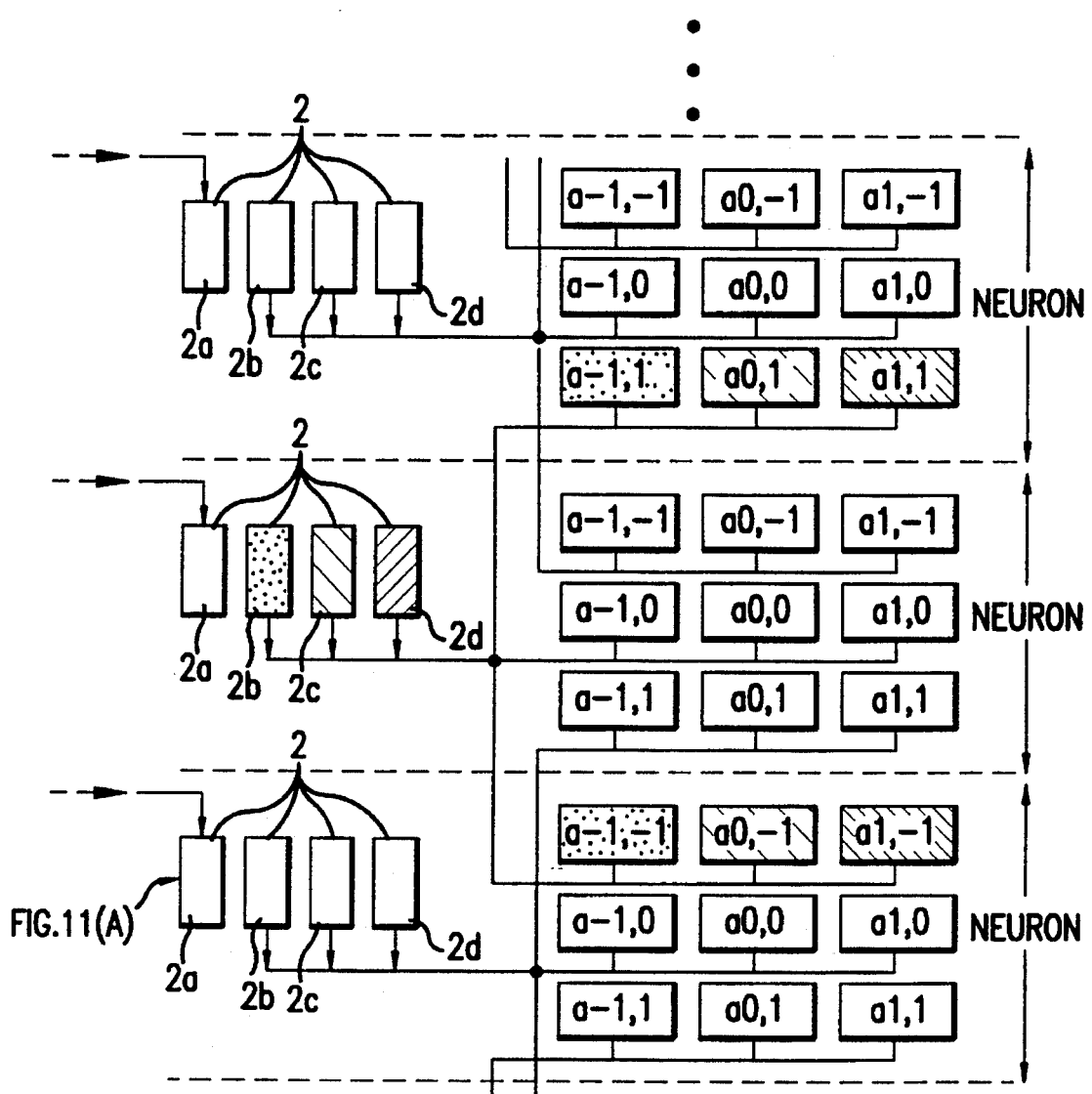
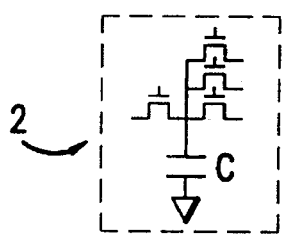
FIG.11
DIRECTION OF CIRCULATION OF COEFFICIENTS
FIG.11(A)

BEFORE PROJECTION

AFTER PROJECTION

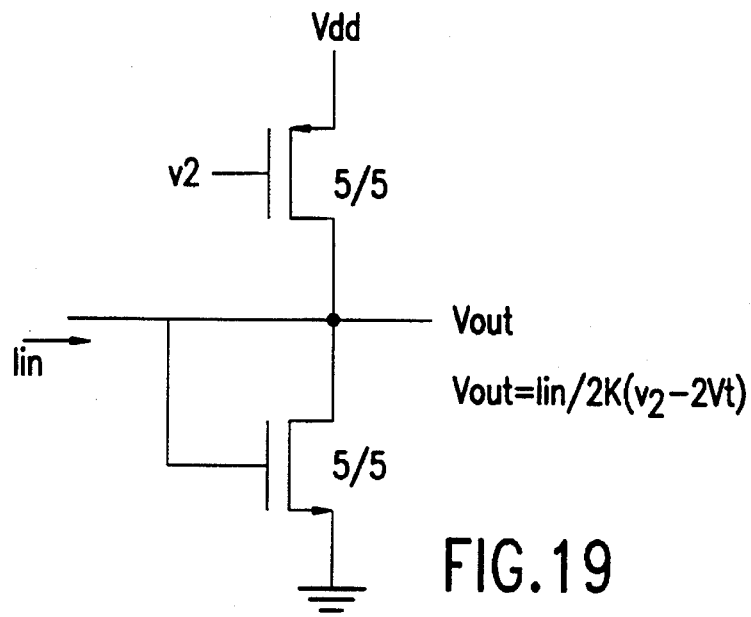
FIG.19
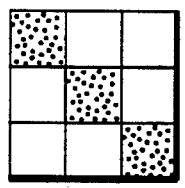
TEMPLATE
SOLID = 3.0V
BLANK = 2.5V
(FIXED INPUT VOLTAGE)
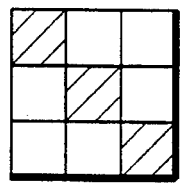
INPUT A
OBLIQUE LINE (VARIABLE)
BLANK = 2.3V (FIXED)
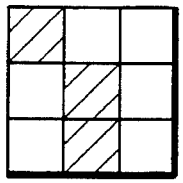
INPUT B
OBLIQUE LINE (VARIABLE)
BLANK = 2.3V (FIXED)
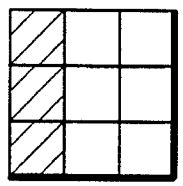
INPUT C
OBLIQUE LINE (VARIABLE)
BLANK = 2.3V (FIXED)
FIG.20

NEURAL NETWORK, PROCESSOR, AND PATTERN RECOGNITION APPARATUS

BACKGROUND OF THE INVENTION

1. Field of the Invention

The present invention relates to improvements in neural networks, hardware for carrying out the functions of a neural network, neural network processors, and neural network pattern recognition apparatuses.

2. Description of the Related Art

A neural network, namely, a system of recognizing predetermined input information and providing the results of the recognition which is, based on a conception entirely differing from those on which conventional methods are based, has been developed and applied to various fields. The neural network is a model of a human brain, which can be realized in various ways.

A neural network has been proposed in a mathematical algorithm having a complex structure. Accordingly, conventional neural networks have been realized by computer simulation. Computer simulation, however, operates at a comparatively low processing speed, which is a problem in some practical applications. Recently, a comprehensive study of the neural network has been made and pieces of hardware for realizing neural networks have been proposed. However, the proposed hardware deals with neural networks having only one or two layers.

A Neocognitron is one model of a neural network. Only a few studies have been made on the development of hardware for realizing a Neocognitron, since a Neocognitron is a neural network having a complex structure. Hardware for realizing a Neocognitron has been reported in a paper published by MIT. This paper was published in the poster session the NIPS (Neural Information Processing & Systems) '90 conference. The hardware is simple in structure comprising, in combination, 143 CCD arrays and seven MDACs (multiplier DA converters). Most circuits employed in the hardware are digital circuits. Basically, both input data and coefficient data are stored in the digital circuits, and the semianalog MDACs carry out multiplication. The method of fabricating this system, however, has not been able to fabricate division circuits satisfactorily to date only first layer has been realized. This hardware has a small degree namely, integration of seven multipliers in 29 $MM^2$.

The realization of such a neural network in hardware has encountered many difficulties and hence methods have been studied for the high-speed simulation of a neural network having three or more layers. One of the methods simulates a neural network using a program executed by parallel processing computers. However, if this method is employed, it often occurs that the computational topology of the neural network does not coincide with the architecture of each computer which reduces the efficiency of data transmission between the processing elements. Even if parallel computers having many processing elements are employed for high-speed simulation, it is difficult to improve the cost performance.

SUMMARY OF THE INVENTION

Accordingly, it is an object of the present invention to provide techniques capable of realizing a neural network of a complex structure, such as Neocognitron, in hardware.

A neural network processor in accordance with the present invention realizing a feed-forward neural network having a multilayer structure comprises a plurality of processing elements respectively corresponding to the neurons of the neural network, wherein the processing elements are MOS analog circuits forming a systolic array and dealing with input and output variables represented as voltages.

In this feed-forward neural network, all of the component neurons of the neural network receive input signals from the previous layer in a normal operating mode, except for signal transmission in a learning mode, such as back propagation signals are never transmitted from the succeeding layer to the previous layer or between the neurons in the same layer.

Preferably, the neural network processor in accordance with the present invention is a neural network processor realizing a Neocognitron.

Preferably, each MOS analog circuit of the neural network processor in accordance with the present invention comprises a plurality of Gilbert multipliers for calculating the sums of products for a numerator, having output terminals connected to each other, a plurality of Gilbert multipliers for calculating the sums of products for denominators, having output terminals connected to each other, and a divider having a first input terminal connected to the output terminals of the Gilbert multipliers for the numerators and second input terminal connected to the output terminals of the Gilbert multipliers for the denominators, and capable of providing a voltage signal output representing the results of the Neocognition of operation. The divider may be, for example, a combination of a current mode divider that provides a current signal representing the result of operation, and a current-voltage converter.

The employment of analog circuits as processing elements enables the construction of a neural network system far superior in cost and performance to the parallel computers employing digital circuits as processing elements. An LSI consisting of analog circuits, in general, requires a silicon substrate having an area smaller than that of a silicon substrate required by an LSI consisting of digital circuits. For example, an analog multiplying circuit can be constructed with about ten transistors, whereas a digital multiplying circuit having the corresponding resolution needs 1,000 to 10,000 transistors. Since the transistors forming an analog circuit, in general, are larger than those forming a digital circuit. The ratio of the area between that occupied by an analog integrated circuit and that occupied by a digital integrated circuit is not simply dependent upon the ratio between the respective numbers of the component transistors of the analog integrated circuit and the digital integrated circuit. However, the employment of analog circuits reduces the occupied area significantly.

The neural network processor in accordance with the present invention is not a hardware system constructed merely by substituting digital circuits of conventional hardware with analog circuits. Generally, an algorithm having a large structure, such as a neural network, realized by hardware employing analog circuits is unable to function properly because intrinsic errors are accumulated in the analog circuits. Accordingly, few trials have been made to construct a multilayer, neural network using analog circuits. No successful results have been reported.

The present invention recognizes that a neural network is satisfactory only if it is able to recognize images or the like. Hence the allowable error for an analog arithmetic circuit forming a neural network may be greater than that for ordinary analog arithmetic circuits. The neural network of the present invention reduces the number of processing elements greatly by regarding the neural network as a three-dimensional systolic array, employing projection and scheduling which are employed in digital circuits, and constructing the neural network by analog circuits of a practically applicable scale.

A systolic array must be pipelined (systolized) to enhance the throughput. Since the present invention employs MOS analog circuits for dealing with analog inputs and output voltage signals, and the analog voltage signals can be stored by pipeline registers each comprising a switch and a capacitor, the systolic array can readily be pipelined. An analog voltage signal can efficiently be applied to a plurality of processing elements using a single line.

The systolic array comprises pipelined processing elements consisting of comparatively simple arithmetic units of the substantially same structure.

When the Neocognitron is to be realized in hardware, the processing elements of the projected systolic array are connected locally, which enables further effective layout of the processing elements on a silicon substrate, because each neuron of the Neocognitron receives an input signal only from neighboring neurons in the previous layer and the loca.1 signal transmission occurs in the projected systolic array.

If a mathematical expression for a $U_s$ layer among those expressing the operation of the neurons (processing elements) of the Neocognitron, which will be described later, is simplified, the expression for the $U_s$ layer becomes identical with an expression for the operation of the neurons of a $U_c$ layer. That is, as will be described later, the expressions are represented by a fractional expression having a numerator and a denominator which are expressed by formula for performing a sum of products.

When Gilbert multipliers which receive analog voltages are used for calculating the sums of products for the numerator and the denominator, inputs to the processing elements can be used for multiplication directly. The output currents of the Gilbert multipliers can be added by connecting the output terminals of the Gilbert multipliers using a single line to obtain the sum of products. The current signals respectively representing the numerator and the denominator are applied respectively to the two inputs of the divider for dividing. Since the outputs of the processing elements must be voltage signals, a divider of a current-input and voltage-output type consisting of a current mode divider and a current-to-voltage converter is used. The analog circuit for the calculation of the sum of products and for division may be constructed using operational amplifiers, the analog circuit consisting of a current mode divider and a current-to-voltage converter is more compact than the analog circuit consisting of operational amplifiers.

Thus, the neural network processor in accordance with the present invention comprises a plurality of MOS analog circuits that receive and provide voltage signals and act as processing elements corresponding to neurons, and the MOS analog circuits constitute a systolic array. Therefore, the processing elements are very small, the number of the processing elements are comparatively small and hence the cost and performance of the neural network processor is satisfactory.

When the Neocognitron is a neural network to be realized in hardware, each of the neurons of the Neocognitron receives inputs only from the neighboring neurons in the previous layer. Therefore, signals are transmitted locally on the projected systolic array, and hence the elements can more effectively be arranged on a silicon substrate.

BRIEF DESCRIPTION OF THE DRAWINGS

The invention is illustrated in the accompanying drawings, in which:

FIG. 1 shows examples of numerals which can correctly be recognized by the Neocognitron;

FIGS. 5(A) and 5(B) are typical views providing assistance in explaining the sizes of layers in the Neocognitron;

FIGS. 10(A) and 10(B) are diagrammatic views of assistance in explaining projection and scheduling;

FIG. 11 is a block diagram providing an analog pipeline register;

FIG. 19 is a circuit diagram of a current-to-voltage converter;

FIG. 20 is a diagram of input patterns employed in the simulation and measurement of a 3×3 input processing element;

DESCRIPTION OF THE PREFERRED EMBODIMENTS

Preferred embodiments of the present invention will be described hereinafter.

Although the present invention is applied to a multilayer feed-forward neural network it is not limited in its application to the Neocognitron, and the present invention will be described as applied to the Neocognitron, which is a neural network most suitable for embodying the present invention among multilayer feed-forward neural networks.

The algorithm of the Neocognitron is well-known and hence the Neocognitron will be described only briefly prior to the description of a hardware system for realizing the Neocognitron. The reader is referred to the following references incorporated by reference herein for further information about the Neocognitron.

[1] K. Fukushima, "Neural Network Model for Selective Attention in Visual Pattern Recognition and Associative Recaller, Applied Optics, Vol. 26, No. 23, December, 1987

[2] K. Fukushima, "A Neural Network for Visual Pattern Recognition", Computer, pp- 65–75, March, 1988

[3] K. Fukushima, "Analysis of the Process of Visual Pattern Recognition by the Neocognitron", Neural Networks, Vol. 2, pp. 413–420, 1989

[4] K. Fukushima, "Neocognitron: A Hierarchical Neural Network Capable of Visual Pattern Recognition", Neural Networks, Vol. 1, pp. 119–130, 1988

The Neocognitron is an improvement to a Cognitron, i.e., a neural network model for image recognition, proposed in [5] K. Fukushima, Cognitron: A selforganizing Multi-layered Neural network", Biol. Cyber., Vol. 20, pp. 121–136, 1975. The Neocognitron is a neural network most suitable for image recognition having a hierarchical structure including a positional error absorbing layer called a $U_c$ layer, and having the advantage of being capable of recognition even with the displacement and deformation of the input images. The Neocognitron is capable of discriminating the numerals shown in FIG. 1 and of correctly recognizing the deformed numeral 11411 shown in FIG. 1.

Most of the multilayer neural networks other than the Neocognitron, such as described in [6] M. L. Minsky, "Perceptron", The MIT Press' 1969, [7] R. P. Lippmann, "An Introduction to Computing with Neural Nets", IEEE ASSP Magazine, pp. 4–22, April, 1987, [8] B. Kosko, "Bidirectional Associative Memories", IEEE Trans. on Systems, Man and Cybernetics, Vol. 18, No. 1, pp. 46–60, January/February, 1988, [9] G. A. Carpenter, "Neural Network Models for Pattern Recognition and Associative Memory", Neural Networks, Vol. 2, pp. 243–257, 1989, and [10] Moises E., Robinson G., Hideki Yoneda, Edger Sanchez-Sinecio, "A Modular VLSI Design of a CMOS Hamming Network", IEEE/ISCAS 91, pp. 1920–1923, June, 1991, are two-layer or three-layer neural networks. The Neocognitron is complex in structure as compared with those neural networks and has, typically, four or more two-dimensional layers. For example, the Neocognitrons described in the references [2] and [3] have eight layers in addition to an input layer.

Figure 2:
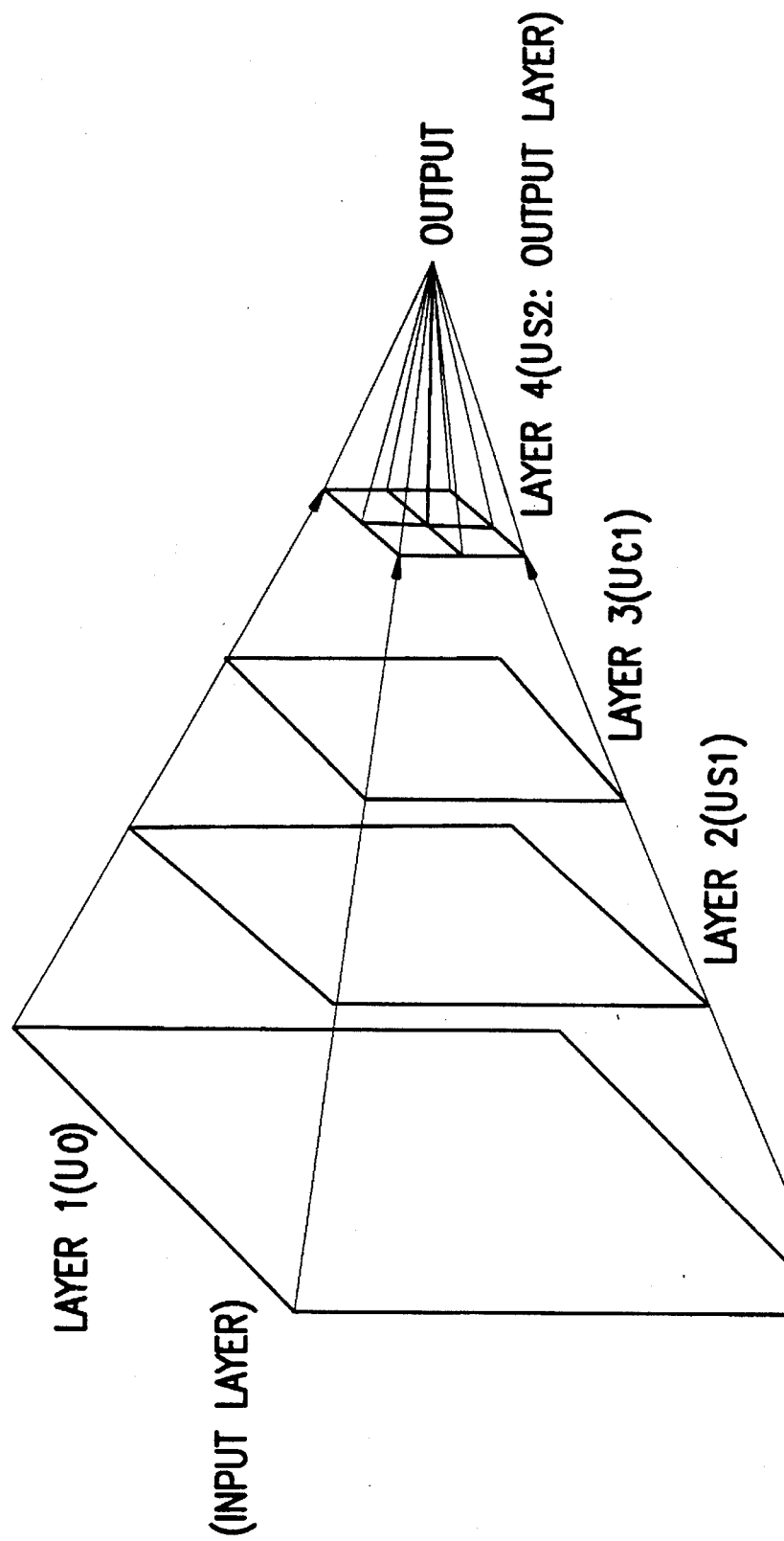
FIG. 2 is a typical view of the three-dimensional structure of the Neocognitron.

FIG. 2 shows a four-layer Neocognitron having four two-dimensional layers each layer reducing in size in the order of arrangement or processing; the last layer is the smallest layer serving as an output layer having a minimum number of neurons. Each layer has subgroups of neurons called windows, each comprising a two-dimensional array of neurons for extracting a local pattern of an input image. Therefore, if N different local features need to be extracted, then at least N windows are necessary.

Figure 3:
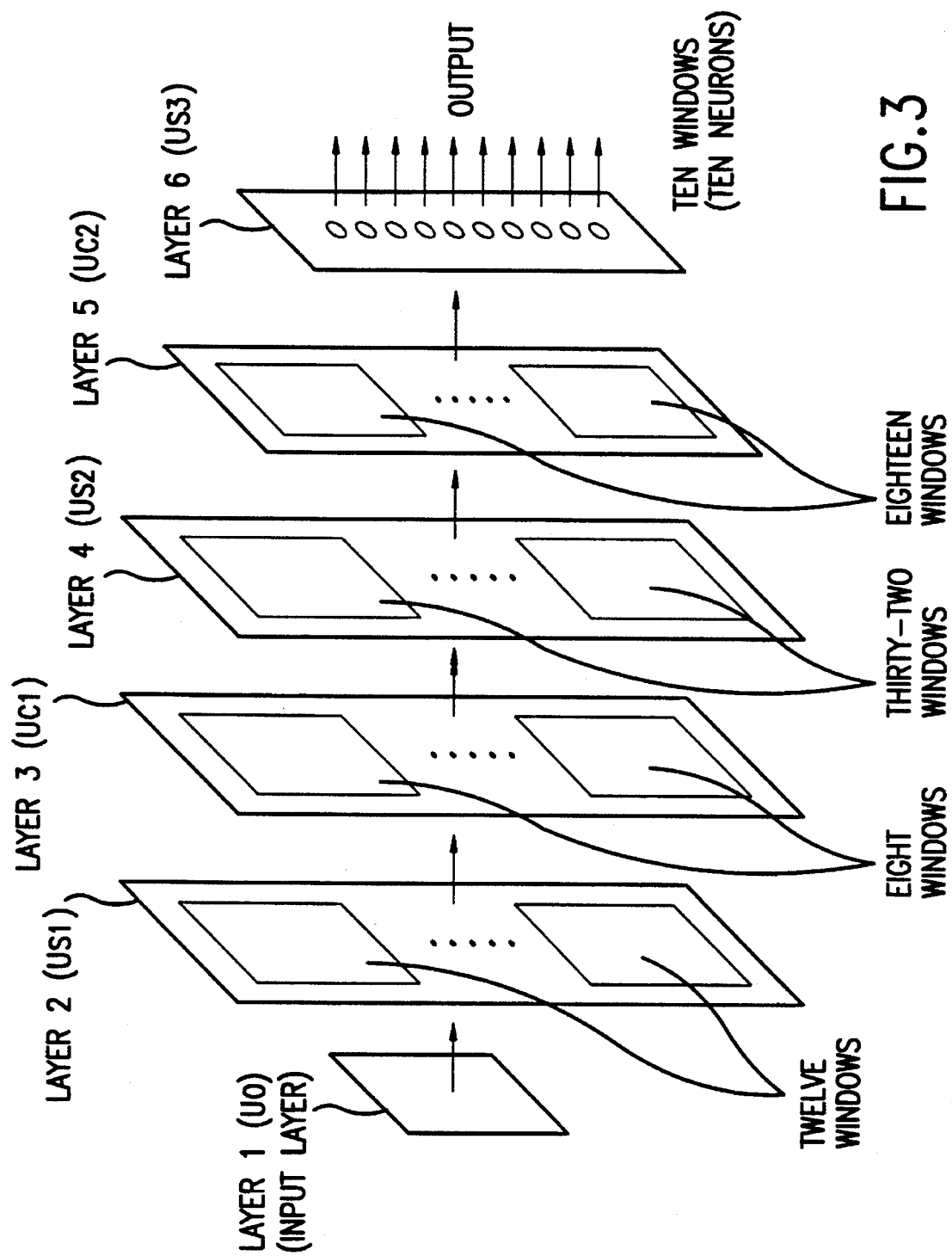
FIG. 3 is a typical view of windows in the Neocognitron.

FIG. 3 shows an arrangement of windows in the Neocognitron for recognizing hand-written numbers. The $U_{s1}$ layer has twelve windows for extracting, for example, horizontal lines, vertical lines and oblique lines, respectively. The size of each of the windows is dependent on the size of the windows of the previous layer, for example, the Usi layer to the $U_{c0}$ layer, and the size of its input region. Each window needs a set of coefficients $a_{k,i,j,k'}$ extract such a local pattern. The set of coefficients $a_{k,i,j,k'}$ corresponds to the intensity or number of the connections of the neurons of a practical neural network, such as the human brain. The subscripts i and j of the coefficients $a_{k,i,j,k'}$ represent displacements respectively in the x-direction and the y-direction relative to the adjacent neurons in the previous layer, the subscript k is the number of the window of the layer, and the subscript k' is the number assigned to the window of the previous layer. Since all the neurons in each window-extract a local pattern, the sets of coefficients $a_{k,i,j,k'}$ for all the neurons of each window are the same. The windows of each layer merges the local patterns extracted by the previous layer to extract more complicated local patterns greater or patterns larger in size than the input local patterns. The area of the windows, i.e., the number of neurons included in the window, of the succeeding layer is smaller than that of the windows of the previous layer, and each of the windows of the last layer has a single neuron for providing the final output. For example, as shown in FIG. 3, each of the ten windows of the $U_{s3}$ layer has a single neuron. The ten neurons of the $U_{s3}$ layer shown in FIG. 3 recognize ten numerals to be recognized by the Neocognitron, respectively. The result of recognition corresponds to the neuron which provides the highest output. In the initial state, the sets of coefficients $a_{k,i,j,k'}$ must be set prior to learning to assign local patterns to the windows.

Figures 4A, 4B:
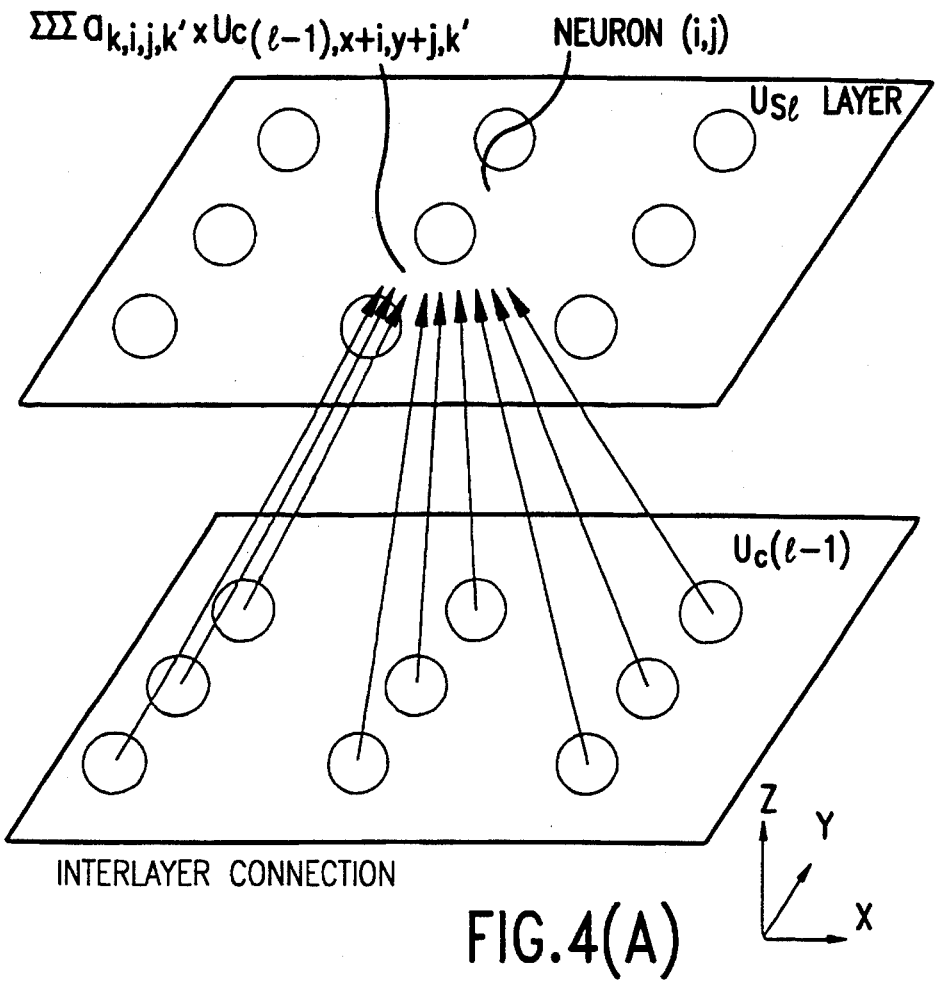
FIGS. 4(A) and 4(B) are a typical view and a table, respectively, providing assistance in explaining local connections in the Neocognitron.

Each of the neurons of the Neocognitron receives only inputs from a neuron at a corresponding position in the previous layer and neurons neighboring the same neuron in the previous layer as shown in FIG. 4(A). The definition of the term "neighboring" depends on the layer. Ordinarily, the number of the neighboring neurons is 3×3, 5×5 or 7×7. As shown in FIGS. 5(A) and 5(B), the smaller local patterns extracted by the previous layer are merged by each succeeding layer to provide larger local patterns, and the size of the windows decreases gradually in the order of the layers. Let us assume that there are two layers which consist of one window, and that the window in a succeeding layer has 3×3 neighbor definition. If the size of the window in the previous layer is 5×5, then the size of the window in the succeeding layer is usually 3×3, because a neuron in the succeeding layer represents a larger local feature which covers a larger area in the input layer than that in the previous layer.

The Neocognitron does not have any feedback loop. Each of the neurons of the succeeding layer receives only the output signals provided by the neighboring neurons of the previous layer. Therefore signals are transmitted always from the previous layer to the succeeding layer and no signal is transmitted from the neurons of the succeeding layer to those of the previous layer or from the neurons of a layer to the other neurons of the same layer.

As stated above, each layer has subgroups of neurons called windows having a two-dimensional rectangular structure included in a plane defined with discrete coordinates x and y. The neurons are disposed respectively at the intersections of parallel lines extending along the x-direction at equal intervals and parallel lines extending along the y-direction at equal intervals. Although the number of the neurons of the Neocognitron is very large, the number of different sets of coefficients $a_{k,i,j,k'}$ is comparatively small because the sets of coefficients for the neurons of each window are the same. If the coefficients for a window are changed during a learning process, the new coefficients apply to all the neurons of the same window; that is, the results of learning apply to all the neurons of the window.

The layers of the Neocognitron are classified into of two types. The $U_s$ layer extracts a local pattern of an input image, and the $U_c$ layer integrates the results of extraction provided by the $U_s$ layer and absorbs positional errors in the input image.

The Neocognitron has an alternate arrangement of the $U_s$ layers and the $U_c$ layers as shown in FIG. 3, which enables the absorption of positional errors in the input image and the deformation of the input image.

Figure 6:
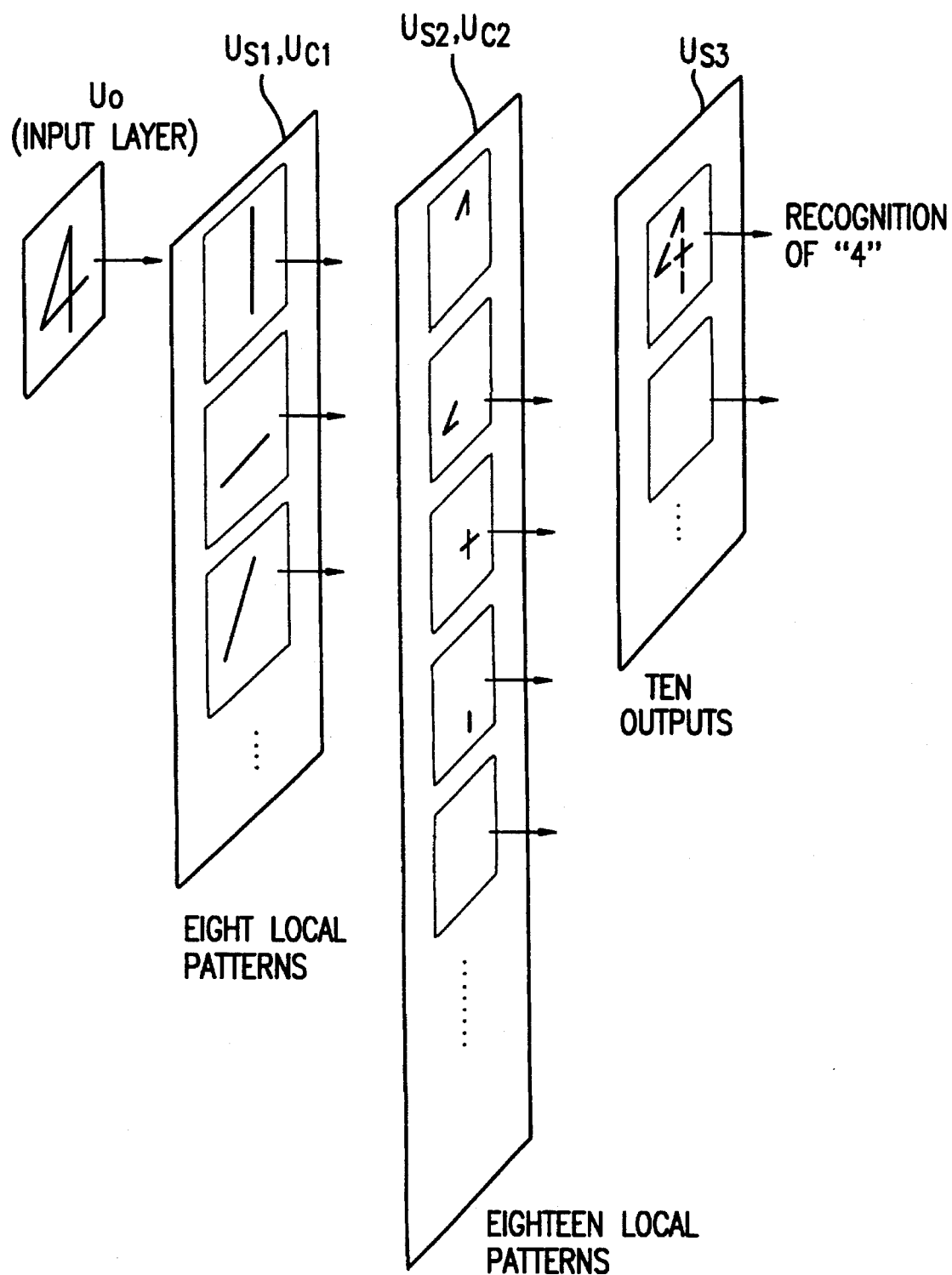
FIG. 6 is a typical view providing assistance in explaining a conception for pattern recognition by the Neocognitron.

The concept of pattern recognition by the Neocognitron will be described with reference to FIG. 6. Simple local patterns, such as horizontal lines and vertical lines, are extracted in the one layer, and the simple patterns are merged in a succeeding layer to extract more complicated local patterns, such as the pattern of the upper end of the numeral "4". The $U_c$ layer interposed between the Us layers gradually absorbs positional errors in the input pattern and the deformation of the input pattern.

Figure 7:
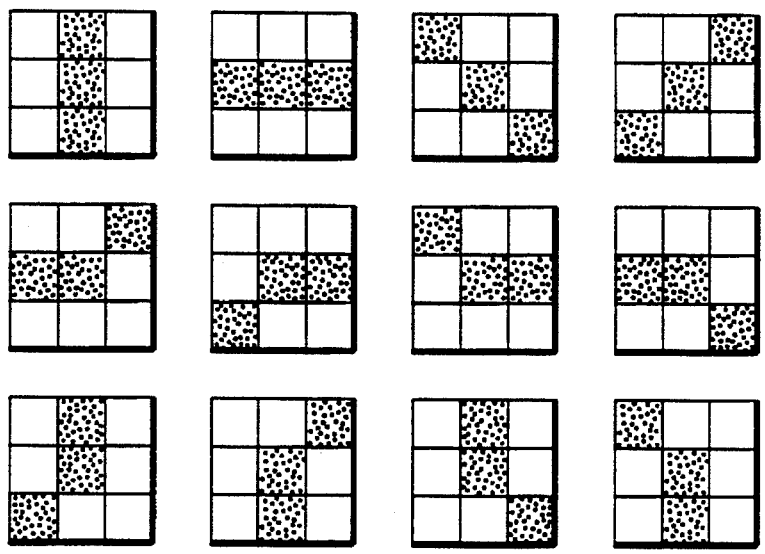
FIG. 7 is a diagram showing twelve coefficient sets employed by a Usl layer.
Figure 8:
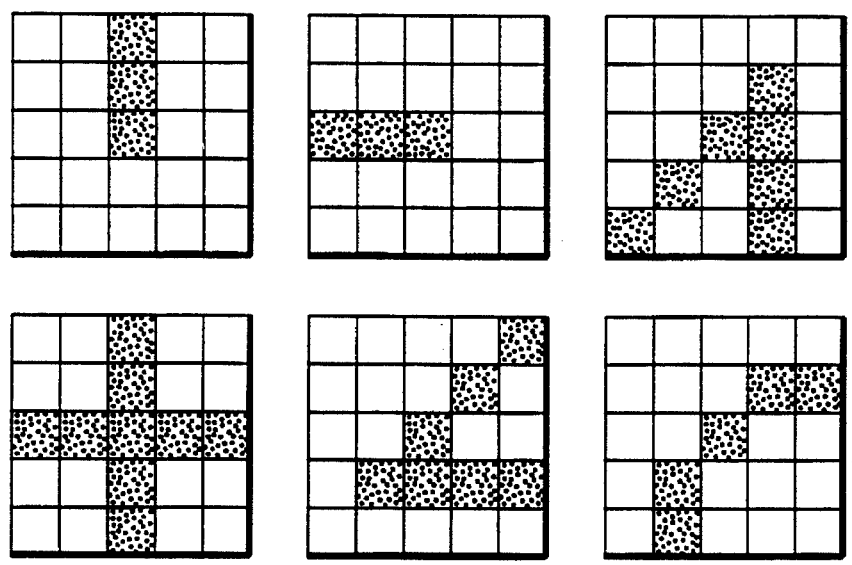
FIG. 8 is a diagram showing coefficient sets employed by a Us2 layer.

The $U_s$ layer computes the two-dimensional convolution of the input image data supplied thereto from the previous layer using the coefficients $a_{k,i,j,k'}$ to extract local patterns. The coefficients $a_{k,i,j,k'}$ correspond to conventional templates employed in digital image processing. FIGS. 7 and 8 show examples of the patterns of templates for teaching the $U_s$ layers. When these templates are used for teaching the $U_s$ layers, the coefficients corresponding to the blank squares of the templates remain zeros and the coefficients corresponding to the solid squares of the templates change from zero to a predetermined positive value and, finally, sets of coefficients $a_{k,i,j,k'}$ equivalent to the templates are obtained.

Simplification of the Arithmetic Model

The models of the neurons of the Neocognitron are more complex than those of the neurons of the conventional neural network described in the references [6] to [10], and the computation executed by the neurons of the $U_s$ layer is particularly complicated. Suppose that a neuron of the Us layer receives 3×3 inputs. Then, the computation to be executed by the neuron of the $U_s$ layer is expressed by $$U_{s(l+1),x,y,k} = \Phi \left[ \frac{\sum_{k'} \sum_{i=-1,0,1} \sum_{j=-1,0,1} a_{k,i,j,k'} U_{cl,x+i,y+j,k'} + C_1}{b_k \sqrt{\sum_{k'} \sum_{i=-1,0,1} \sum_{j=-1,0,1} U^2_{cl,x+i,y+j,k'} + C_2}} + C_s \right] ; \quad (1)$$

$$(\Phi) = \begin{cases} 0, & \text{in case that } \upsilon \leq 0 \\ \upsilon, & \text{in other cases} \end{cases}$$

where $C_1$, $C_2$ and $C_3$ are constants, $U_{s(l+1),x,y,k'}$ and $U_{cl,x,r,y,k}=\upsilon$ are the outputs of the layer in question and the previous layer, respectively, x and y are the coordinates of the neurons of each window, 1 and k are the number of the layer in which the window including the neuron in question is inclined or positioned, and the number of the window including the neuron in question, respectively, and k' is the number of the window of the previous layer which gives input signals to the neuron, the values of the sets of coefficients $a_{k,i,j,k'}$ are specified for each window, the coefficients represent the intensity of interconnection (synapses) of the neurons, and bk is the mean of the coefficients $a_{k,i,j,k'}$, which is used for normalizing the outputs of the neurons. To facilitate understanding expression (1), a simple example will be described hereinafter.

If $a_{k,i,j,k}=1$ if i=j $a_{k,i,j,k}=0$ if i≠j $U_{cl,x+i,y+j,k}=\vee$ if i=j $U_{cl,x+i,y+j,k}=0$ if i≠j $C_1=C_2=1$ $C_3=-1$ $b_k=\sqrt{3}$ Rearranging expression (1) by substituting these conditions into expression (1), $Us(l+1),x,y,k=(3\upsilon+1)/(\upsilon+1)-1$ if $\geq 0$ $Us(l+1),x,y,k=0$ if $<0$ \quad (2)

Figure 9A:
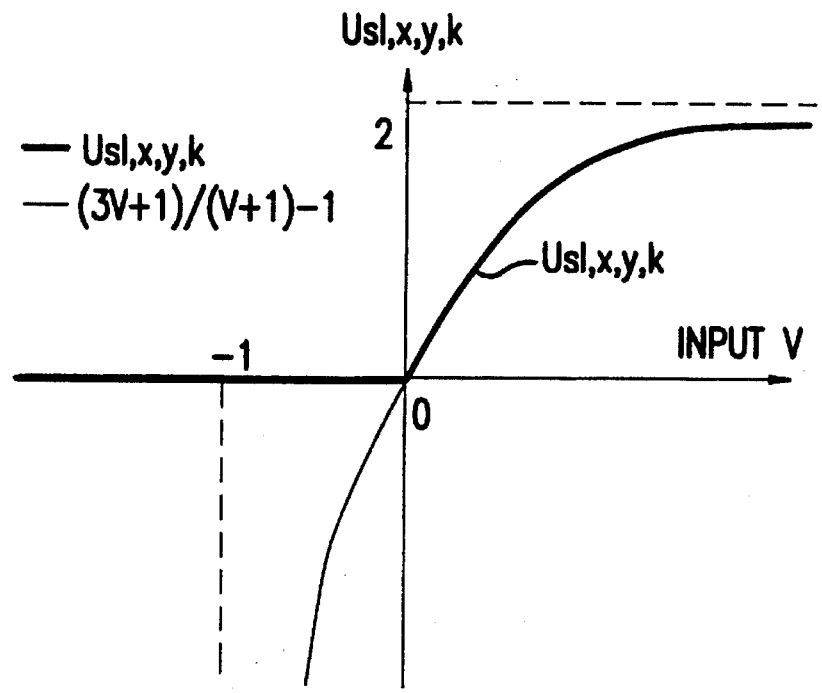
FIG. 9 is a chart providing assistance in explaining the operation of a neuron.
Figure 9B:
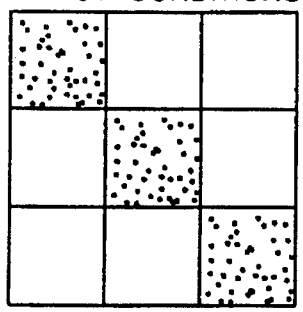
Figure 12A:
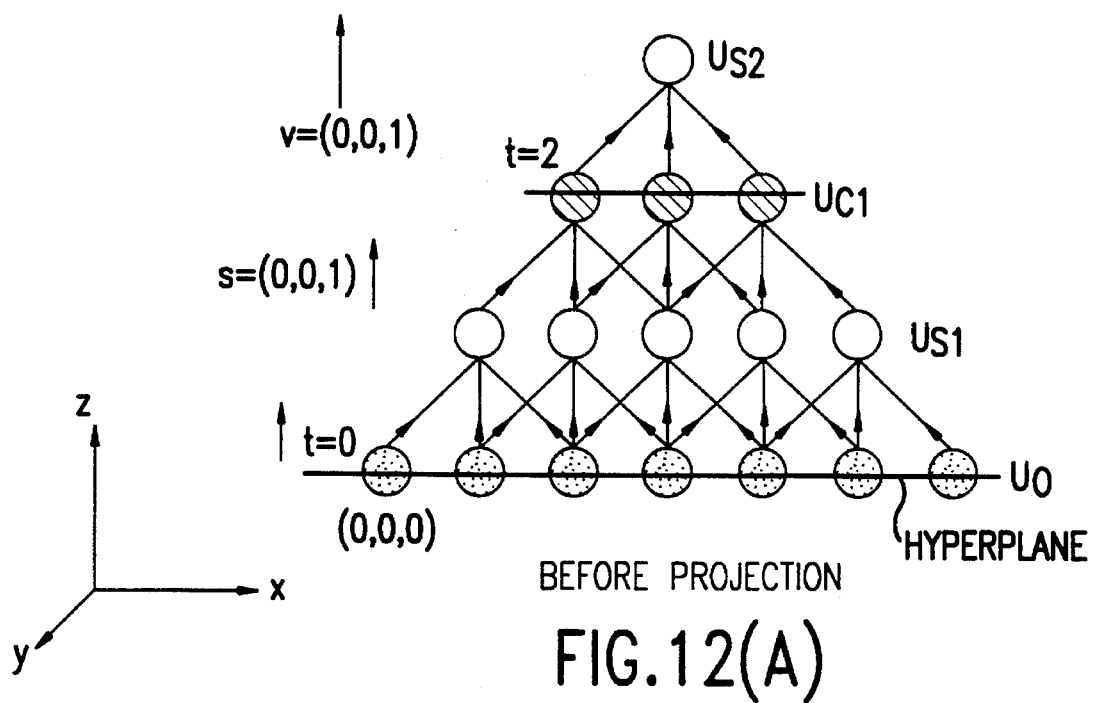
FIGS. 12(A) and 12(B) are diagrammatic views of assistance in explaining another projection and another scheduling.
Figure 12B:
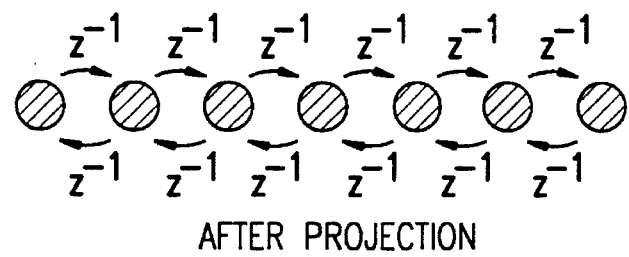

FIG. 9 shows the variation of the output $U_{s1,x,y,k}$ with the input. FIGS. 4(A) and 4(B) show the physical interpretation of expression (2). The computation executed by each neuron is the division of the results of two-dimensional convolution by the root-mean-square (rms) of the inputs. The sets of coefficients $a_{k,i,j,k'}$ in expression (1) correspond to synapse connection intensities.

Results of our simulations prove that, in most cases, the root-mean-square can be substituted with the mean. When the mean is employed instead of the root-mean-square, expression (1) can be written as follows.

$$U_{s(l+1),x,y,k} = \Phi \left[ \frac{\sum_{k'} \sum_{i=-1,0,1} \sum_{j=-1,0,1} a_{k,i,j,k'} U_{cl,x+i,y+j,k'} + C_1}{\sum_{k'} \sum_{i=-1,0,1} \sum_{j=-1,0,1} b_k \times U_{cl,x+i,y+j,k'} + C_2} + C_s \right] \quad (3)$$

On the other hand, the computation executed by the neurons of the $U_c$ layer is simple as compared with computation executed by the neurons of the Us layers. If the neuron receives 3×3 inputs, $$U_{cl,x,y,k} = \Psi_k \left[ \sum_{k'} \sum_{i=-1,0,1} \sum_{j=-1,0,1} a_{k,i,j,k'} \times U_{sl,x+i,y+j,k'} \right] \quad (4)$$

$$\Psi_k(\upsilon) = \frac{\Phi(\upsilon)}{\Phi(\upsilon) + \alpha_k}$$

where $\alpha_k$ is a constant. This function has a shape similar to that shown in FIG. 9. The difference between expressions (3) and (4) is that the coefficient of the numerator is different from that of the denominator in expression (3) whereas the respective coefficients of the numerator and denominator are the same in expression (4).

The $U_s$ layers and the $U_c$ layers may be of the same circuit configuration or construction if expression (3), obtained by simplifying expression (1) relevant to the $U_s$ layers, is used, which simplifies the hardware.

Pipelining and Scheduling

The Neocognitron described in the reference [4] needs 34,000 neurons for processing inputs from 19×19 pixels when recognizing a hand-written character. The number of neutrons is reduced by projection along the direction of the x-axis as shown in FIGS. 10(A) and 10(B) when realizing the array of neurons in a hardware when the projection vector P=(1, 0, 0) is used. The x-axis is one of the two axes, i.e., the x-axis and the y-axis, defining the input layer. Projection is a method of mapping a three-dimensional array of a larger number of processing elements (neurons) on a two- or one-dimensional array of a smaller number of processing elements. Projection in an appropriate direction allows reduction of a plurality of processing elements to a single processing element because the processing element is reused. Suppose that the projection vector is P=(1, 0, 0). Then, the processing elements at positions (x, y, z)=(i, j, k) in the three-dimensional array are mapped to positions (y, z)= (j, k) in a two-dimensional array. Thus, the three-dimensional array of neurons of the Neocognitron is mapped to a two-dimensional array of neurons by projection in the direction of the projection vector P=(1, 0, 0), so that the hardware system can be constructed only by processing elements corresponding to the neurons included in a mapped y-z plane for each window. The projection reduces the 34,000 neurons required by the Neocognitron described in the reference [4] to about 2,000 neurons (processing elements), which is about 6% of the neurons in the three-dimensional array of neurons of the Neocognitron described in the reference [4].

A scheduling vector S is selected after the projection is performed. Although there are many available scheduling vectors S, only a few are suitable. The scheduling vector S indicates the direction of advancement of a hyperplane in which the processing elements that operate substantially simultaneously are arranged. Once the scheduling vector S is determined, all the processing elements at positions n=(i, j, k) in the original three-dimensional array operate at time t=n·S ("·" indicates scaler product).

The operation of the system is completed after the hyperplane has passed all the processing elements (neurons). FIG. 10(A) shows an example of the scheduling vector S. If a scheduling vector S=(1, 0, or 1) indicated by an alternate long and short dash line is selected, signals are transmitted between the processing elements in the hyperplane in one or the same pipeline period. Accordingly, one processing element is not able to start computation until the prior processing elements complete computation, which delays signal transmission within the hyperplane and the pipeline period must be increased. Suppose that scheduling vector S=(1, 0, 2) is selected. Then, the processing elements in the hyperplane do not transmit signals in one pipeline period and the array is fully systolized. The term "systolization" means a state in which all the processing elements are pipelined at each hyperplain. All the neurons of the Neocognitron receive inputs only from the neighboring neurons in the previous layer. These neighboring neurons in the previous layer are mapped on the neighboring processing elements of the previous pipeline stages. This input voltage data provided from the previous layer is accumulated in an analog pipeline register 2 (FIGS. 11 and 14) of each neuron, comprising capacitors and switches. When the input region has 3×3 neighboring neurons as shown in FIG. 10(A), the same signal may be applied to the adjacent neurons (processing elements) as shown in FIG. 11 and hence each neuron may be provided with four analog pipeline registers. The circuit surrounded by a dotted line in FIG. 11 is an analog pipeline register 2.

One analog pipeline register 2a among the four analog pipeline registers 2a, 2b, 2c and 2d is used for holding the result of the computation carried out by the processing element in the previous pipeline stage, and the three other analog pipeline registers 2b, 2c and 2d are used for holding the results of previous pipeline stages in the previous three pipeline periods. The analog pipeline registers 2b, 2c and 2d hold the results of computation in the previous pipeline stage one pipeline period before the current pipeline period, that of two pipeline periods before the current pipeline period and that of three pipeline periods before the current pipeline period, respectively. ordinarily, one pipeline period is as short as, for example, μsec. Therefore, the analog pipeline register 2 may be provided with a very small capacitor, which is enough to hold a voltage during several pipeline periods. The very small capacitors enable the system to be constructed on a very small portion of a silicon substrate of a Large Scale Integrated (LSI) Circuit.

The contents of the analog pipeline registers 2 must be shifted along the hyperplane shown in FIGS. 10(A) and 10(B) an advance by one neuron after the completion of the computation in one pipeline period. In another method example, the coefficients of each neuron are shifted in the opposite direction in the input region of the neuron instead of shifting the contents of analog pipeline registers 2 as shown in FIG. 11, which is equivalent to the shifting of the contents of the analog pipeline registers 2. Accordingly, the destination of the data held by each analog pipeline register 2 need not be changed. This method reduces errors attributable to the change of destination of the data in each analog pipeline register 2, and the data can accurately be held for several pipeline periods.

The direction of the projection vector P is not fixed; it is possible that P=(0, 0, 1). For example, when the projection vector P=(0, 0, 1), the scheduling vector S=(0, 0, 1) is selected, the result of computation in the previous pipeline stage can be stored and used for computation in the present pipeline stage as described before.

Configuration of the Hardware System

Figure 13:
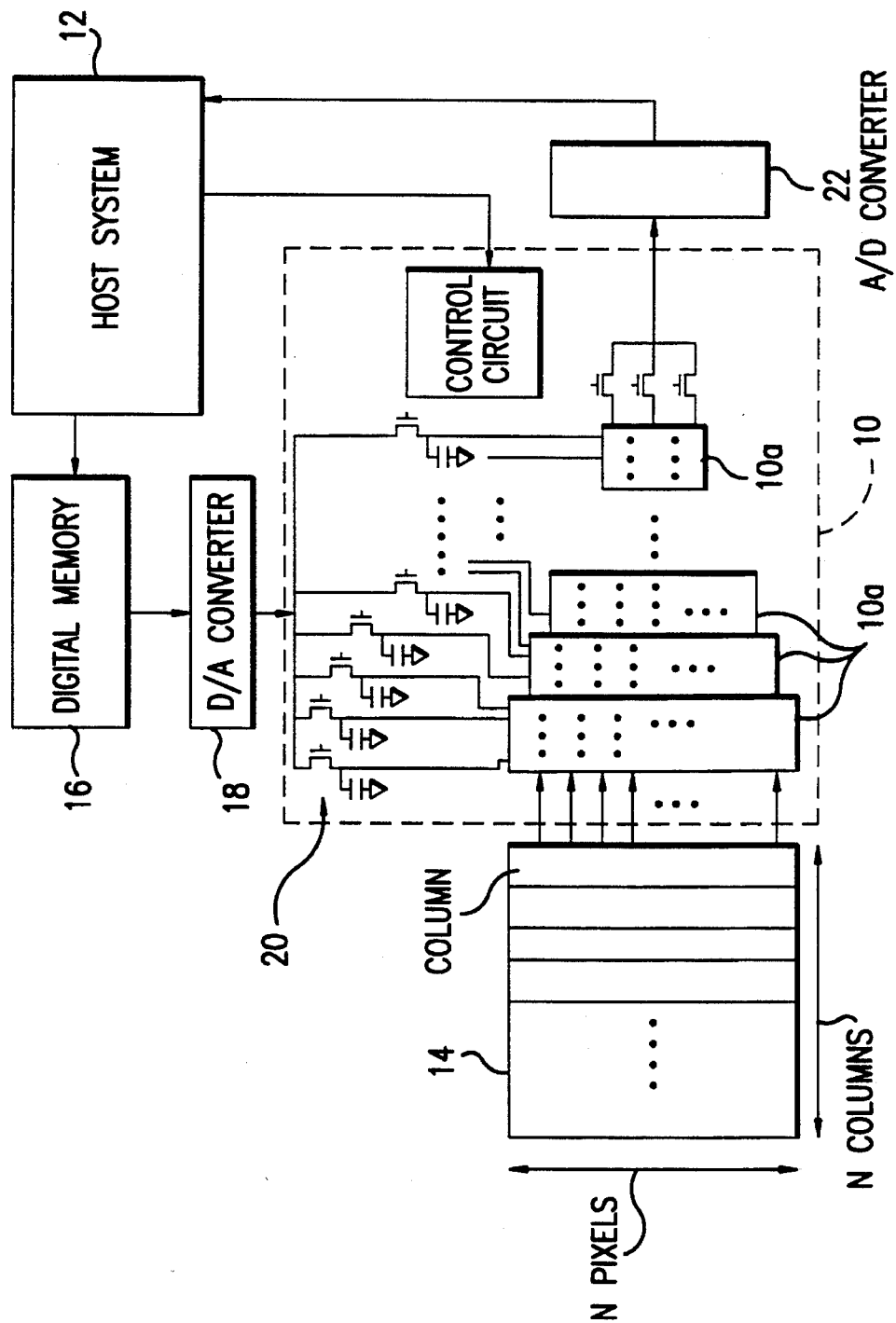
FIG. 13 is a block diagram of a hardware system.

Referring to FIG. 13, an analog processor 10 for carrying out computations in pipeline stages 10a is controlled by, for example, a host system 12 which can be a simple logic system such as FSM (Finite State Machine). The principal task of the host system 12 is to control switches for switching voltage signals stored in the analog pipeline registers 2 and voltage signals corresponding to the sets of coefficients $a_{k,i,j,k'}$.

Figure 14:
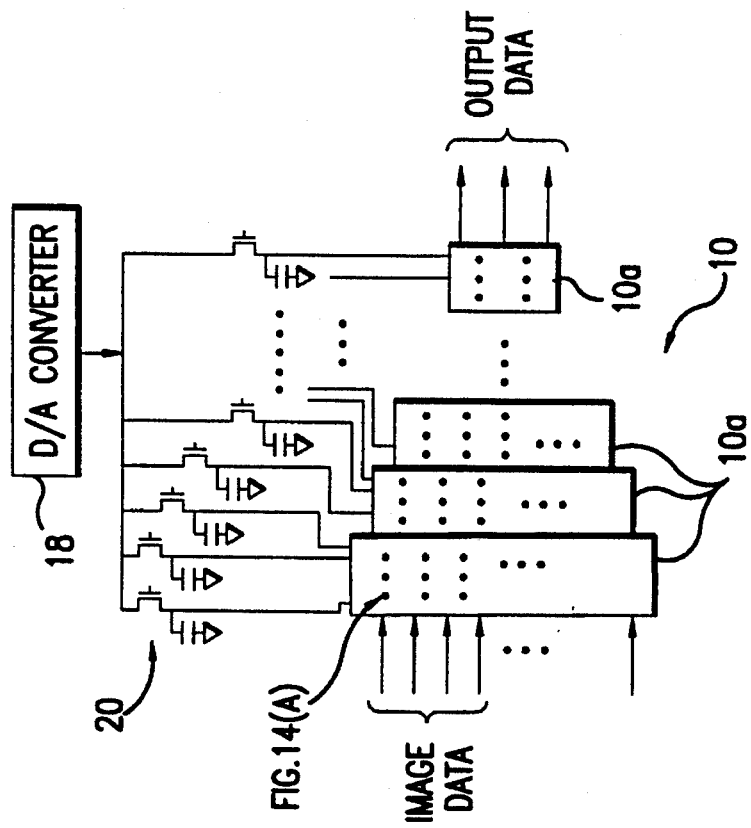
FIG. 14 is a view showing a typical layout of analog neurons.
Figure 14A:
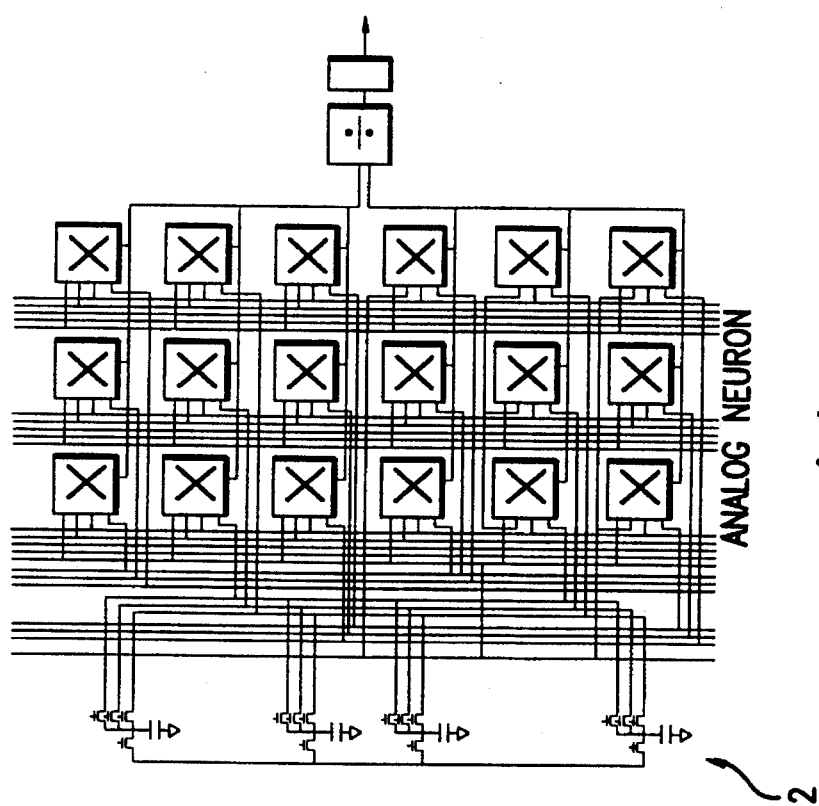
Figure 15:
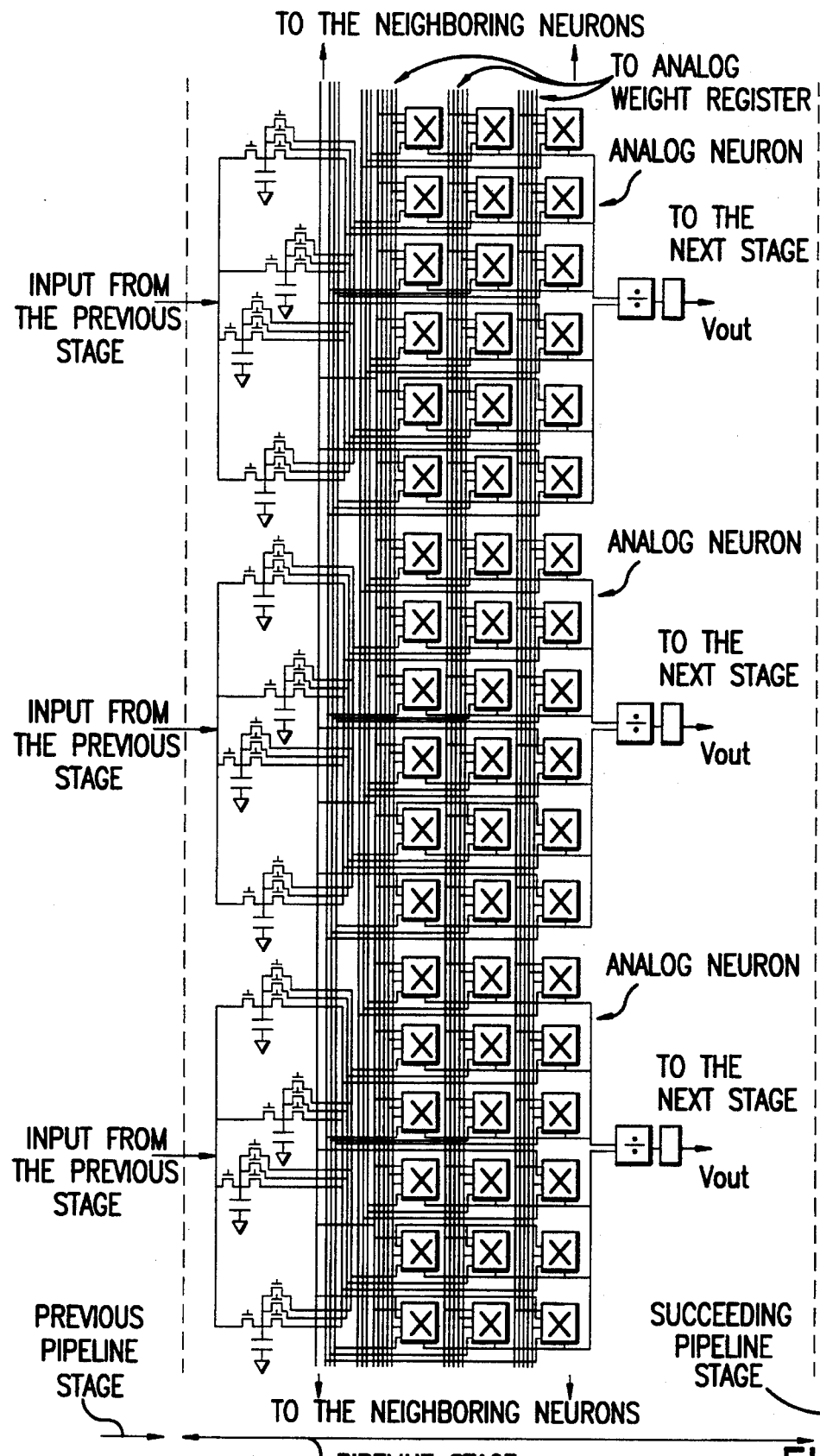
FIG. 15 is a block diagram of a pipeline stage.

N×N pixel data 14 is divided into N columns each of N pixels, and the N columns of pixels are applied sequentially to the analog processor 10. All the sets of coefficients $a_{k,i,j,k'}$ and reference voltages are stored in a digital memory 16 and are fed through a D/A converter 18 to the analog processor 10. As mentioned above, since all the neurons in a window use the same set of coefficients, the coefficients and the reference voltages are distributed to a plurality of neurons. Accordingly, the number of input voltage signals provided by the host system 12 to the analog processor 10 is small as compared with the number of neurons (processing elements) formed in a VLSI chip. The analog processor 10 comprises an array of analog neurons (analog processing elements) and as shown in an enlarged view in FIG. 14 are disposed in a close arrangement. In FIG. 14, blocks marked with "×" are analog multipliers and a block marked with "÷" is an analog divider, which will be described later. Vertical lines are conductive lines connected to the neurons of the windows of each pipeline stage as shown in FIG. 15 to transmit analog voltage signals representing the coefficients and reference voltages which the analog multipliers need. The analog voltage signals accumulated in the capacitors of analog weight registers 20 are transmitted through the conductive lines. Since the voltage signals are stored in the capacitors, the D/A converter 18 is able to provide all the voltage signals during a pipeline period.

Since each neuron receives inputs only from the neighboring neurons in the previous layer, the pipeline stages are connected locally, which facilitates the design of the VLS1. Similarly to multilayer neural networks other than the Neocognitron, this Neocognitron is able to carry out a learning process. The host system carries out or controls the learning process in a time period longer than that for a normal mode. Input patterns erroneously recognized in the normal mode are stored in the system or in an external memory, and the erroneously recognized input patterns are provided to the analog processor 10 in the learning mode. Then, the outputs of the intermediate layers are monitored, the outputs are converted into digital signals by the A/D converter 22, the digital signals are given to the host system 12, and the digital signals are stored in a digital memory 16. The host system 12 calculates a propagation error for learning on the basis of the outputs of the intermediate layers. Although the addition of functions for the learning mode to the host system 12 may make the host system 12 somewhat intricate, the host system 12 having the functions can be implemented on the chip with the analog processor.

Basic Processing Element

Figure 16:
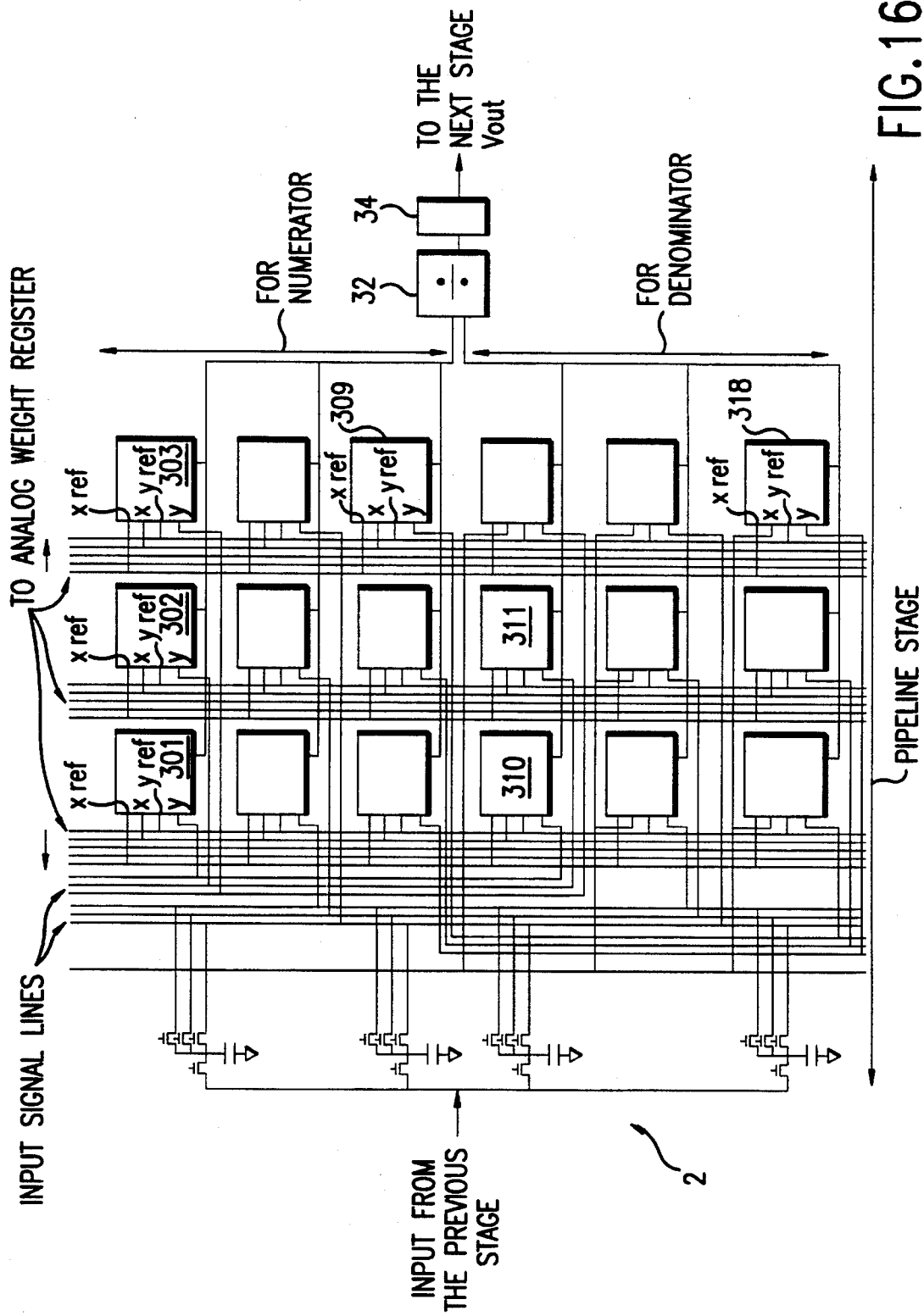
FIG. 16 is a block diagram of a 9-input analog neuron.

As stated above, the processing elements of the $U_s$ layers execute the computation represented by expression (3) including multiplication and division. FIG. 16 shows a 9-input 3×3 neuron. As mentioned above, the processing element is realized or implemented as an analog circuit. The 9-input neuron comprises eighteen analog multipliers 301, 302, . . . , and 318, and an analog divider 32.

Generally, an N-input neuron needs 2N multipliers and a divider, because each of the numerator and denominator of expression (3) includes N multiplications. The basic processing element in this embodiment comprises an analog current mode divider shown in FIG. 17 and described in more detail in ([121] K. Bult and H. Wallings, "A Class of Analog CMOS Circuits Based on the Square-Law Characteristic of an MOS transistor in Saturation", IEEE Journal of Solid State Circuits, Vol. sc22, No. 3, pp. 357–365, June, 1987, incorporated by reference herein, and conventional Gilbert multipliers as shown in FIG. 18.

Figure 17:
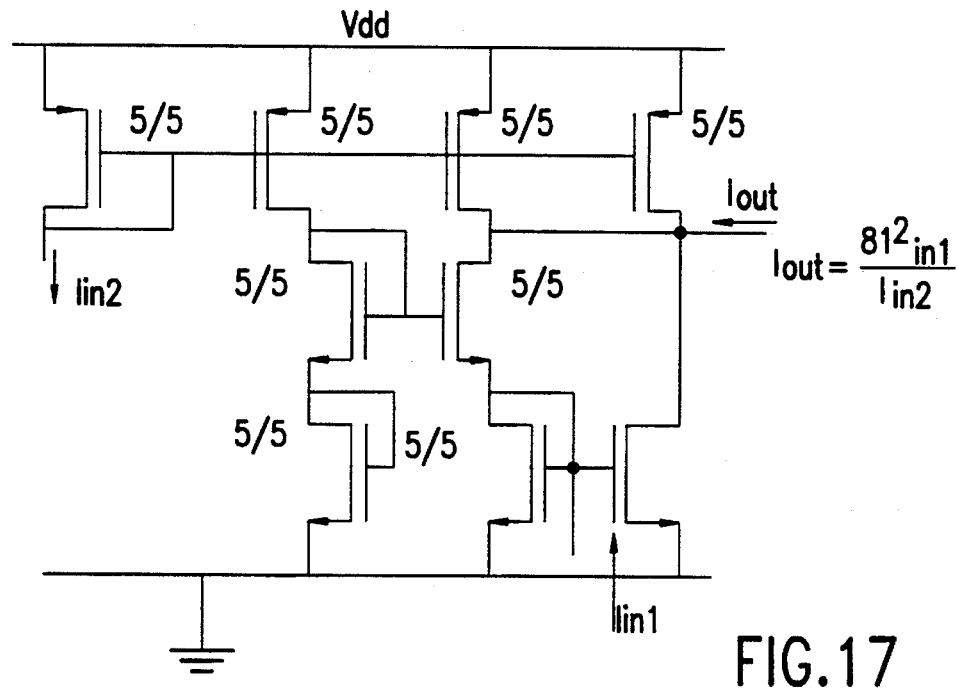
FIG. 17 is a circuit diagram of a current mode divider.
Figure 18:
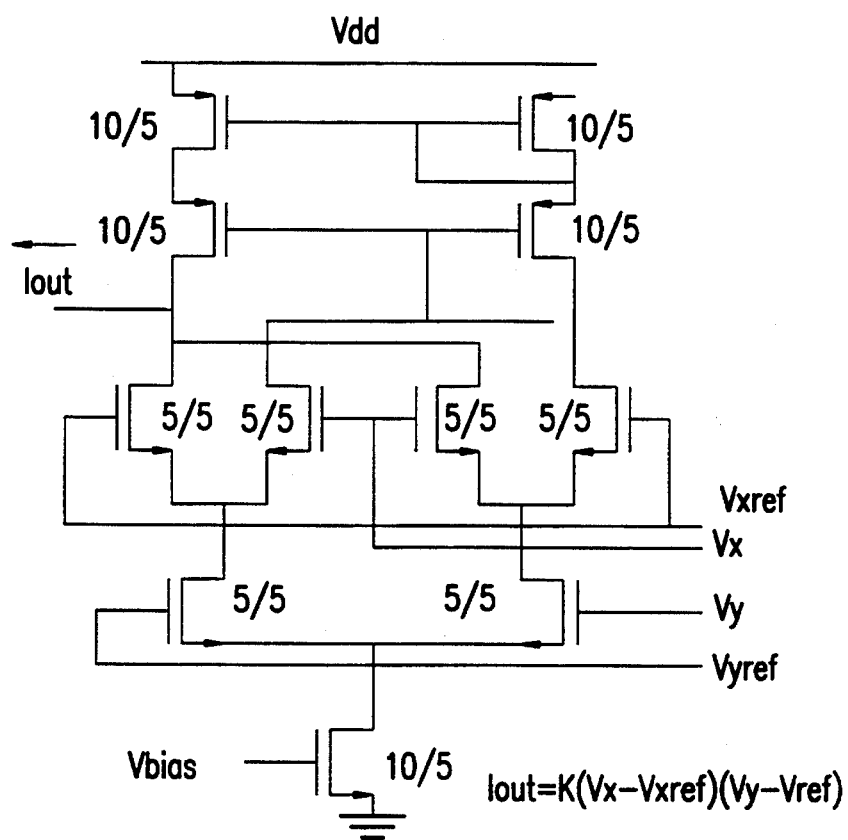
FIG. 18 is a circuit diagram of a Gilbert multiplier.

In FIGS. 17 and 18, the numerators and denominators of fractions, such as 5/5 and 10/5, written beside MOS transistors indicate the channel width W and the channel length L in μm, respectively, of the corresponding MOS transistors.

Inputs $U_{c1,x,y,k'}$ are voltages Vx–Vxref received from the neurons of the previous layer, coefficients are voltages $V_y$–$V_{yref}$ received from the analog weight register 20 (FIGS. 13 and 14). The voltages $V_x$–$V_{xref}$ are multiplied by the voltages $V_y$–$V_{yref}$ by the multipliers 301, 303, . . . , and 318, and the products converted into current signals. The current signals provided by the nine multipliers 301, 302, . . . , and 309 for calculating the numerator are applied to a first node, and the current signals provided by the nine multipliers 310, 311, . . . , and 318 for calculating the denominator are applied to a second node, and the sum of the current signals applied to the first node and the sum of the current signals applied to the second node are applied to the current mode divider 32. The output current signal of the divider 32 is converted into a voltage signal by a conventional current-to-voltage converter 34. An external signal to be applied through a common line to a plurality of processing elements must be a voltage signal.

The analog circuit employed in this embodiment, similar to other analog circuits, is not an ideal analog circuit. For example, the divider 32 performs a calculation expressed by $I_{in1} \times I_{in1}/I_{in2}$, which is not correct division. The output signals of the divider 32 and the multipliers 301, 302, . . . , and 318 contain respective offset currents. The output signal of the current-to-voltage converter 34 contains an offset voltage. However, these offset currents and the offset voltage causing errors can easily be eliminated. For example, the divider 32 can function as an ideal divider if only input signals in a limited range are applied to he divider 32. The offset currents contained in the outputs of the divider 32 and the multipliers 301, 302 . . . and 318 affect only the constants $C_1$, $C_2$ and $C_3$ of expressions (3) and (4). The offset voltage contained in the output of the current-to-voltage converter 34 can be cancelled when a reference voltage $V_{ref}$ for the multiplication in the next pipeline stage is equal to the offset voltage. The error tolerant algorithm of the neural network of the present invention permits comparatively large allowances for other causes of error in the circuits.

Since expression (4) to be executed in the $U_c$ layers is similar to expression (3) to be executed in the $U_s$ layers, the processing elements of the $U_c$ layers may be entirely the same as those of the $U_s$ layers. The $U_c$ layers and the $U_s$ layers are different from each other in the connection of the lines for transmitting the coefficients. Accordingly, the same processing elements connected by wiring applicable to both the $U_c$ layers and the $U_s$ layers can be applied either to the $U_c$ layers or the $U_s$ layers.

Results of Experiments and Simulation

Figure 21:
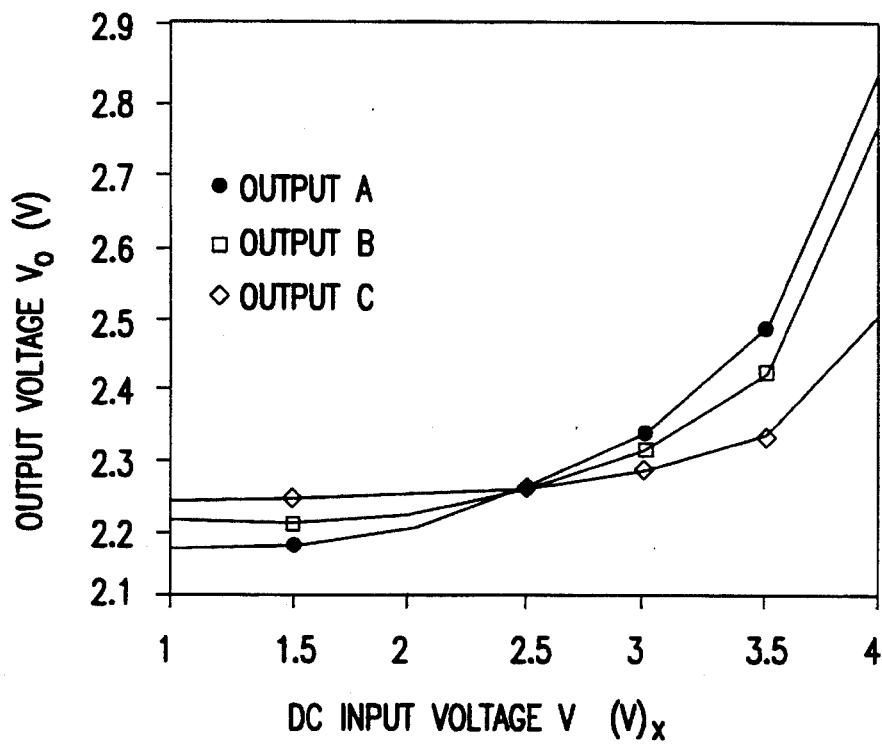
FIG. 21 is a graph showing the variation of the measured output voltage of processing elements with input voltage to the same.
Figure 22:
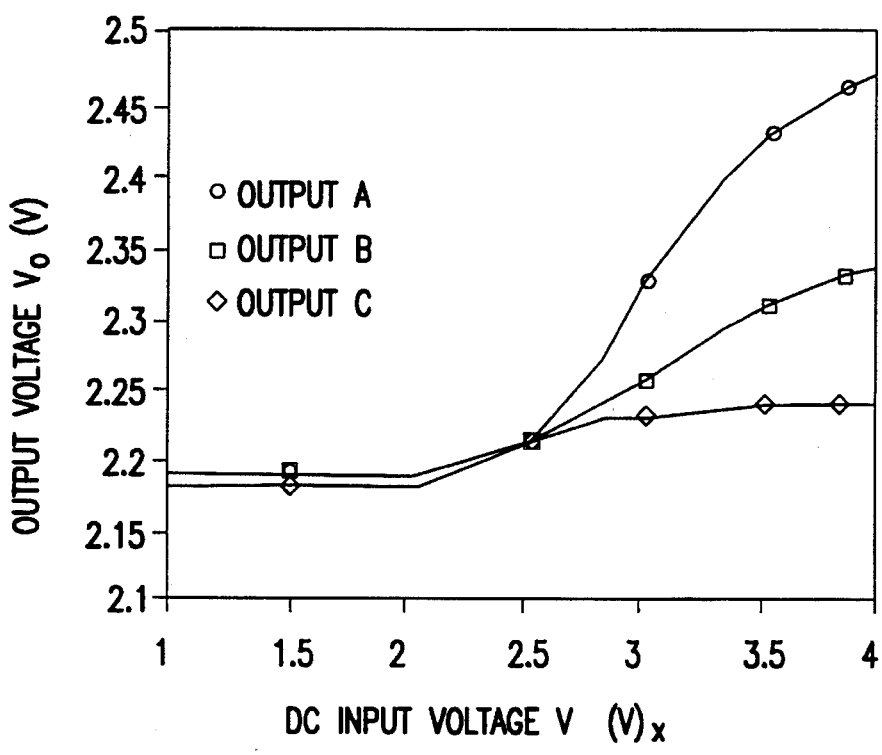
FIG. 22 is a graph showing the results of an analog circuit simulation of processing elements.

FIGS. 21 and 22 show the results of simulation of the 9-input neuron (processing element) and the results of simulation of the 9-input neuron by an analog circuit simulator, respectively. FIG. 20 shows a template, an input A perfectly matching the template, an input B partially matching the template, and an input C not matching the template. The inputs A, B and C were applied to the 9-input neuron and the outputs of the 9 input neuron were measured. The same inputs A, B and C were used for simulation.

In FIGS. 21 and 22, output voltage Vo and input voltage $V_x$ correspond respectively to $U_{s(l+1),x,y,k}$ and input $v$ of expression (2). As is obvious from the results shown in FIGS. 21 and 22, the 9-input neuron discriminated the inputs A, B and C from each other. The pattern separating capability deteriorated slightly because the channel length modulation coefficient $\lambda$ of the MOS transistors of the circuit was greater than that expected, nevertheless, the neuron was able to discriminate correctly the pattern differing from the template.

Figure 23:
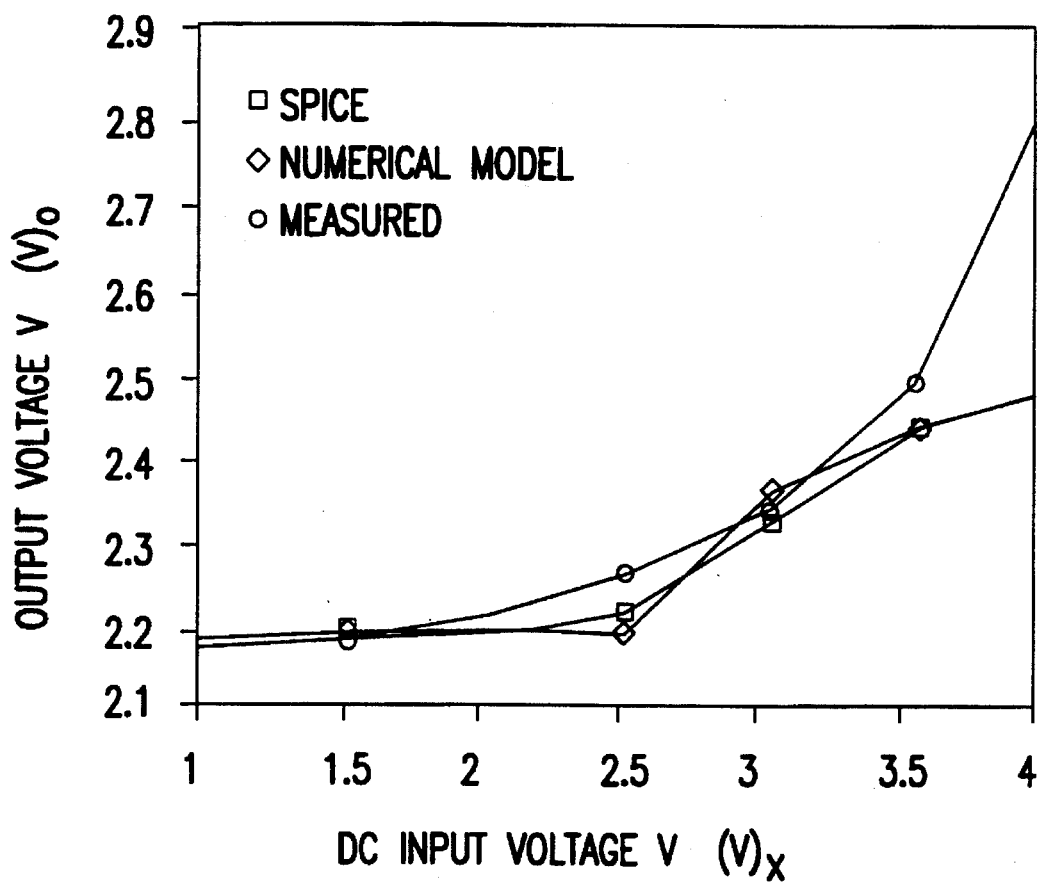
FIG. 23 is a graph comparatively showing measured results, the results of simulation and calculated results.

FIG. 23 shows measured results, results of simulation by an analog circuit simulator, and calculated results (numerical model). The results of simulation agree very well with the calculated results obtained by calculation using expression (3), and the difference between the measured results and the results of simulation increases with applied voltage when the input voltage $V_x$ is greater than 3.5 V. This problem can be solved by employing transistors having a larger channel length L and hence a smaller channel length modulation coefficient $\lambda$ or by providing inputs in a limited range to the analog neuron.

A simulation program simulating a 6-layer Neocognitron having 11×11 pixel inputs was developed to confirm the general operation of a Neocognitron. A model neuron employed in the simulation program is based on simplified expressions (3) and (4). It was confirmed that characters shown in FIG. 1 can correctly be recognized through the execution of the simulation program.

The neuron (processing element) was fabricated with 2 μm CMOS technology and was formed in a very small area of 450 μm×650 μm. A systolic array of only 2,000 processing elements matched the neural networks comprising 34,000 neurons shown in the references [2] and [3] in character recognition capability.

Accordingly, a neural network processor in accordance with the present invention requires an area of 585 mm²=450 μm×650 μm×2,000, and hence the neural network processor can be realized by two or three semiconductor chips of an ordinary scale having an area on the order of 250 mm². This hardware with 1 μs pipeline period can recognize a character in 26 μs, and it is about one million times faster than software simulation on a personal computer. Thus, the neural network processor in accordance with the present invention has excellent cost performance.

What is claimed is:

1. A multilayer feed-forward neural network of component neurons, comprising:

a plurality of processing elements, each corresponding to a respective one of the component neurons of said multilayer feed-forward neural network, said plurality of processing elements being connected to form a systolic pipelined array, each processing element comprising MOS analog circuitry for receiving input voltages and outputting at least one voltage signal, said MOS analog circuitry comprising a plurality of multipliers for calculating at least one sum of a product.

2. The neural network of claim 1 wherein:

said multilayer feed-forward neural network further comprises at least a part of a Neocognitron.

3. The neural network of claim 2 wherein, said plurality of multipliers comprise first Gilbert multipliers for calculating at least one sum of a product for a numerator, each comprising an output connected to outputs of each other and second Gilbert multipliers for calculating at least one sum of a product for a denominator, each comprising an output connected to outputs of each other and said MOS analog circuitry further comprises a divider comprising a first input connected to the outputs of the first Gilbert multipliers, and a second input connected to the outputs of the second Gilbert multipliers, and outputting a result of a division computation.

4. The neural network according to claim 1 wherein:

each of said processing elements output the at least one voltage signal corresponding to electrical currents applied to a current mode division circuitry.

5. The neural network of claim 1 further comprising:

analog pipeline registers each comprising at least one switch and one capacitor for storing computational results of previous pipeline stages.

6. The neural network of claim 5 further comprising:

coefficient providing means for transmitting coefficients to said neurons; and coefficient updating means for updating said coefficient providing means by shifting said coefficients.

7. The neural network of claim 6 wherein said plurality of multipliers further comprise first Gilbert multipliers for calculating a sum of products for a numerator, each comprising an output connected to outputs of each other and second Gilbert multipliers for calculating a sum of products for a denominator, each comprising an output connected to outputs of each other and said MOS analog circuitry further comprises a divider comprising a first input connected to the outputs of the first Gilbert multipliers, and a second input connected to the outputs of the second Gilbert multipliers for outputting a result of a division computation.

8. The neural network of claim 1 wherein each of said plurality of multipliers comprises a plurality of first multipliers for calculating a first sum of products for a numerator and a plurality of second multipliers for calculating a second sum of products for a numerator and said MOS analog circuitry further comprises a divider outputting a result of a division computation of said numerator and denominator.

9. The neural network of claim 8 wherein:

said plurality of first multipliers comprises first Gilbert multipliers for calculating the sum of products for the numerator, each comprising an output connected to outputs of each other;

said plurality of second multipliers comprises second Gilbert multipliers for calculating the sum of products for the denominator, each comprising an output connected to outputs of each other; and said divider comprises a first input connected to the outputs of the first Gilbert multipliers, and a second input connected to the outputs of the second Gilbert multipliers, and outputting the result of the division computation.

10. The neural network of claim 1 wherein said systolic pipelined array is fully systolized.

11. The neural network of claim 1 wherein said plurality of multipliers are Gilbert multipliers.

12. A neural network processor, comprising:

a plurality of processing elements connected to form a three dimensional systolic pipelined array, each of said processing elements comprising MOS analog circuitry for receiving input voltages and outputting at least one voltage signal, said MOS analog circuitry comprising a plurality of multipliers for calculating at least one sum of a product.

13. The neural network processor of claim 12 wherein:

said three dimensional systolic array comprises a multilayer feed-forward neural network.

14. The neural network processor of claim 13 wherein:

each of said processing elements are connected for receiving an input signal only from neighboring processing elements in a preceding previous layer of said multilayer feed-forward neural network.

15. The neural network processor of claim 13 wherein:

said multilayer feed-forward neural network comprises at least a part of a Neocognitron.

16. The neural network processor of claim 15 comprising:

means for extracting a local pattern of an input image using at least a mean value of said input.

17. The neural network processor of claim 15 wherein, said plurality of multipliers comprises a plurality of first multipliers for calculating a first sum of products for a numerator and a plurality of second multipliers for calculating a second sum of products for a numerator and said MOS analog circuitry further comprises a divider outputting a result of a division computation of said numerator and denominator.

18. The neural network processor of claim 17 wherein:

said plurality of first multipliers comprises first Gilbert multipliers for calculating the sum of products for the numerator, each comprising an output connected to outputs of each other;

said plurality of second multipliers comprises second Gilbert multipliers for calculating the sum of products for the denominator, each comprising an output connected to outputs of each other; and said divider comprises a first input connected to the outputs of the first Gilbert multipliers, and a second input connected to the outputs of the second Gilbert multipliers, and outputting the result of the division computation.

19. The neural network processor of claim 13 wherein said three dimensional systolic pipelined array is fully systolized.

20. The neural network processor of claim 12 wherein, said plurality of multipliers comprise a plurality of first Gilbert multipliers for calculating a sum of products for a numerator, each comprising an output connected to outputs of each other and a plurality of second Gilbert multipliers for calculating a sum of products for a denominator, each comprising an output connected to outputs of each other and said MOS analog circuitry further comprises a divider comprising a first input connected to the outputs of the plurality of first Gilbert multipliers, and a second input connected to the outputs of the plurality of second Gilbert multipliers, and outputting a result of a division computation.

21. The neural network processor of claim 14 wherein:
said plurality of multipliers are connected to multiply output voltages from respective MOS analog circuitry of a preceding stage with preselected coefficient voltage values.

22. The neural network processor according to claim 12 wherein:
each of said processing elements outputs the at least one voltage signal corresponding to electrical currents applied to a current mode division circuitry.

23. The neural network processor of claim 12 further comprising:
analog pipeline registers each comprising at least one switch and one capacitor for storing computational results of previous pipeline stages.

24. The neural network processor of claim 23 further comprising:
coefficient providing means for transmitting coefficients to said plurality of processing elements; and
coefficient updating means for updating said coefficient providing means by shifting said coefficients.

25. The neural network processor of claim 24 wherein said plurality of multipliers further comprises first Gilbert multipliers for calculating a sum of products for a numerator, each comprising an output connected to outputs of each other and second Gilbert multipliers for calculating a sum of products for a denominator, each comprising an output connected to outputs of each other and said MOS analog circuitry further comprises a divider comprising a first input connected to the outputs of the first Gilbert multipliers and a second input connected to the outputs of the second Gilbert multipliers for outputting a result of a division computation.

26. The neural network processor of claim 24 wherein said processor further comprises at least a part of a Neocognitron.

27. The neural network processor of claim 12 wherein said plurality of multipliers are Gilbert multipliers.

* * * * *

UNITED STATES PATENT AND TRADEMARK OFFICE
CERTIFICATE OF CORRECTION

PATENT NO. : 5,519,811
DATED : May 21, 1996
INVENTOR(S) : Hideki Yoneda and Edgar Sánchez-Sinencio It is certified that error appears in the above-indentified patent and that said Letters Patent is hereby corrected as shown below:

ON THE COVER PAGE:

Please add the following Assignee:

Section [73] Assignee:

<u>The Texas A & M University System,</u>

<u>College Station, Texas</u>

Signed and Sealed this

First Day of April, 1997

*Attest:*

BRUCE LEHMAN

*Attesting Officer*     *Commissioner of Patents and Trademarks*